United States Patent
Nijland

(10) Patent No.: US 11,582,434 B2
(45) Date of Patent: Feb. 14, 2023

(54) HDR COLOR PROCESSING FOR SATURATED COLORS

(71) Applicant: KONINKLIJKE PHILIPS N.V., Eindhoven (NL)

(72) Inventor: Rutger Nijland, Someren (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 17/184,221

(22) Filed: Feb. 24, 2021

(65) Prior Publication Data

US 2021/0266509 A1  Aug. 26, 2021

(30) Foreign Application Priority Data

Feb. 25, 2020 (EP) .................................... 20159237

(51) Int. Cl.
*H04N 9/77* (2006.01)
*H04N 9/68* (2006.01)
(Continued)

(52) U.S. Cl.
CPC ............... *H04N 9/77* (2013.01); *H04N 9/68* (2013.01); *H04N 19/17* (2014.11);
(Continued)

(58) Field of Classification Search
CPC  H04N 9/77; H04N 9/68; H04N 19/46; H04N 19/186; H04N 19/17; H04N 19/182
See application file for complete search history.

(56) References Cited

U.S. PATENT DOCUMENTS

| | | | |
|---|---|---|---|
| 10,652,537 B1* | 5/2020 | Sun | H04N 19/12 |
| 2014/0355897 A1* | 12/2014 | Tourapis | H04N 19/186 |
| | | | 382/233 |

(Continued)

FOREIGN PATENT DOCUMENTS

| | | |
|---|---|---|
| EP | 3496028 A1 | 6/2019 |
| WO | 2017102606 A1 | 12/2016 |

(Continued)

OTHER PUBLICATIONS

C. Poynton "The Magnitude of Nonconstant Luminance Errors" A Technical Introduction to Digital Video, New York, John Wiley & Sons 1996.

*Primary Examiner* — Zaihan Jiang

(57) ABSTRACT

To mitigate some problems of the pixel color mapping being used in HDR video decoding of the type of SLHDR, a high dynamic range video encoding circuit (300) is taught, configured to encode a high dynamic range image (IM_HDR) of a first maximum pixel luminance (PB_C1), together with a second image (Im_LWRDR) of lower dynamic range and corresponding lower second maximum pixel luminance (PB_C2), the second image being functionally encoded as a luma mapping function (400) for decoders to apply to pixel lumas (Y_PQ) of the high dynamic range image to obtain corresponding pixel lumas (PO) of the second image,
the encoder comprising a data formatter (304) configured to output to a video communication medium (399) the high dynamic range image and metadata (MET) encoding the luma mapping function (400),
the functional encoding of the second image being based also on a color lookup table (CL(Y_PQ)) which encodes a multiplier constant (B) for all possible values of the pixel lumas of the high dynamic range image, and the formatter being configured to output this color lookup table in the metadata, characterized in that the (Continued)

high dynamic range video encoding circuit comprises:
—a gain determination circuit (302) configured to determine a luma gain value (G_PQ) which quantifies a ratio of an output image luma for a luma position equal to a correct normalized luminance position divided by an output luma for the luma of the pixel of the high dynamic range image,
wherein the high dynamic range video encoding circuit comprises a color lookup table determination circuit (303) configured to determine the color lookup table (CL(Y_PQ)) based on values of the luma gain value for various lumas of pixels present in the high dynamic range image.

Similarly we teach how the same principles can be embodied in a SLHDR-type video decoder.

7 Claims, 6 Drawing Sheets

(51) Int. Cl.
*H04N 19/182* (2014.01)
*H04N 19/186* (2014.01)
*H04N 19/17* (2014.01)
*H04N 19/46* (2014.01)

(52) U.S. Cl.
CPC ......... *H04N 19/182* (2014.11); *H04N 19/186* (2014.11); *H04N 19/46* (2014.11)

(56) References Cited

U.S. PATENT DOCUMENTS

| | | |
|---|---|---|
| 2017/0064334 A1* | 3/2017 | Minoo ................ H04N 19/186 |
| 2017/0085897 A1* | 3/2017 | Narasimhan ........... H04N 19/30 |
| 2018/0005356 A1 | 1/2018 | Van Der Vleuten et al. |
| 2018/0146190 A1* | 5/2018 | Cai ....................... H04N 19/30 |
| 2018/0276801 A1 | 9/2018 | Stessen |
| 2019/0052908 A1 | 2/2019 | Mertens et al. |
| 2020/0099908 A1* | 3/2020 | Stessen .................... H04N 9/77 |
| 2020/0193573 A1* | 6/2020 | Thebault .............. H04N 1/6058 |
| 2020/0236381 A1* | 7/2020 | Chujoh ................. H04N 19/186 |
| 2020/0357100 A1* | 11/2020 | Tichelaar ................ H04N 9/77 |
| 2020/0404234 A1* | 12/2020 | Thebault .............. H04N 1/6061 |
| 2021/0092393 A1* | 3/2021 | Chao ...................... H04N 19/50 |
| 2021/0099699 A1* | 4/2021 | Pan ....................... H04N 19/182 |
| 2021/0201852 A1* | 7/2021 | Lee ......................... G09G 3/20 |

FOREIGN PATENT DOCUMENTS

| | | |
|---|---|---|
| WO | 2017108906 A1 | 6/2017 |
| WO | 2017157977 A1 | 9/2017 |

\* cited by examiner

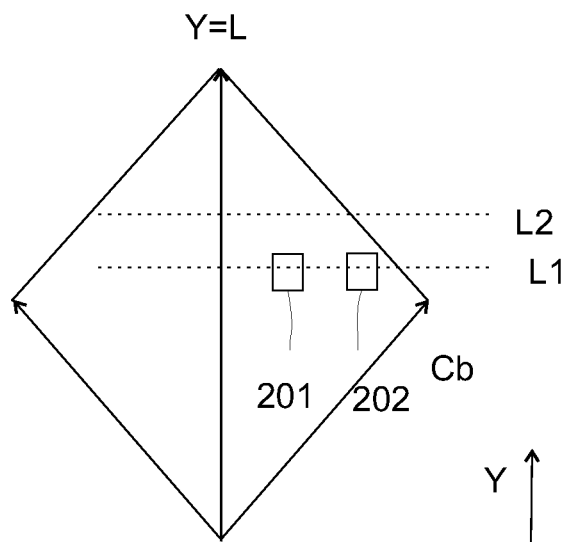
Fig. 2A
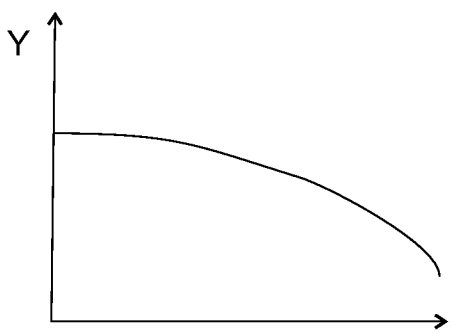
Fig. 2B
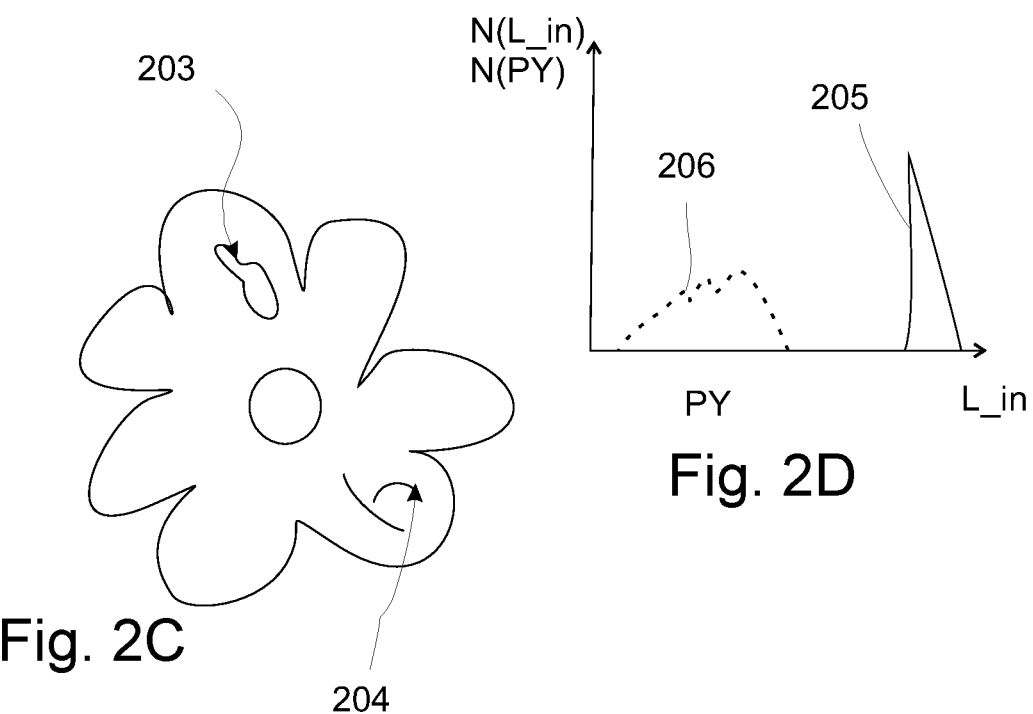
Fig. 2C
Fig. 2D

HDR COLOR PROCESSING FOR SATURATED COLORS

FIELD OF THE INVENTION

The invention relates to methods and apparatuses for doing dynamic range conversions involving changes of the luminance of pixels from an input image to the luminance of pixels of an output image, in particular when said images contain highly saturated pixel colors.

BACKGROUND OF THE INVENTION

High dynamic range video handling (coding, display adaptation and the like) is a quite recent technical field, which still comes with several unsettled questions and problems. Although HDR televisions are being sold for a few years now (typically with a maximum displayable luminance a.k.a. peak brightness of 1000 nit or Cd/m^2 or less), the technology that comes before the pure displaying (content making, coding, color processing) still has a number of solutions to invent/improve and deploy. There have been a number of movies which have been created and communicated, and also a few early-days broadcasts, and though in general the result is great, there are also still possibilities to further improve on certain aspect, ergo, the technology is not in a phase of being largely settled currently.

High dynamic range images are defined as images that compared to the legacy low dynamic range images a.k.a. standard dynamic range images (which were generated and displayed in the second half of the $20^{th}$ century, and are still the mainstream of most video technologies, e.g. television or movie distribution over whichever technology, from terrestrial broadcasting to youtube video supply via the internet and the like), typically have more impressive colors, which means that typically they can have brighter pixels (both encoded, and displayed).

Formally, one can define the luminance dynamic range as the span of all luminances from a minimum black (MB) to a peak white or peak brightness (PB), ergo, in principle one might have HDR movies with very deep blacks. Pragmatically one may define, and handle, e.g. color process, the HDR images mainly on the basis of a sole value, namely being a higher peak brightness or more formally luminance (usually this is what users are most interested in, whether it be bright explosions or merely the more realistic specular reflection spots on metals and jewels and the like, and one may pragmatically state the minimum black to be the same for the SDR image and an HDR image).

In practice from legacy times one can state that the SDR image's 1000:1 luminance dynamic range would fall below 100 nit (and above 0.1 nit), and a HDR image would typically have at least 5× brighter PB, ergo, 500 nit or higher. More precisely, even though a legacy SDR image doesn't have a clear maximum luminance, one would display it on an end-user display of approximately 100 nit display peak brightness (PB_D). And one can re-interpret SDR images, in the novel HDR framework, as having its brightest pixel luma correspond to exactly 100 nit.

Note that, without diving into many details which may be unnecessary here, one may indicate which kind of HDR one has by associating a peak brightness number as metadata to the HDR image. This may be seen as the luminance of the brightest pixel existing in the image, or more precisely brightest codeable image pixel in a video of images, and is often formally defined by associating a reference display with the image (i.e. one associates a virtual display with the image, with its peak bright corresponding to the brightest pixel which exists in the image or video, i.e. the brightest pixel which needs displaying, and then one codes this PB_C—C for Coding—of that virtual display as metadata additional to the image pixel colors matrix). The skilled reader can understand that, whatever the coding peak brightness PB_C of a HDR image is, one can create normalized pixel luminances by dividing each pixel luminance by PB_C. Normalized lumas can also be made by dividing by the highest possible code, e.g. 1023 in 10 bit or the like.

In this manner one need not "unelegantly" code HDR images with an excessive amount of bits (e.g. 16 bits per color component), and can simply re-use existing technology with a 10 bit word length for the color components (12 or more bits already seen as rather heavy by several tech suppliers in the total video handling chain, for various reasons, at least for the near future, and usually considered for professional non-consumer use only; and the PB_C metadata allows to easily upgrade the HDR framework for future scenarios).

One aspect re-used from classic video engineering as that pixel colors are typically always communicated as YCbCr colors, with Y the so-called luma component (which is the technical coding for the luminance) and Cb and Cr a blue and red chroma component completing the trichromatic additive color definition.

The luma is defined from the non-linear R'G'B' color components (the prime ' indicating the difference from linear RGB components of the colors, amounts of red, green and blue photons coming out of a displayed pixel of any particular color so to speak), and via an equation which reads:

$$Y=a1*R'+a2*G'+a3*B'. \qquad [\text{Eq. 1}]$$

The three constants depend on the particular primaries defining the RGB color (obviously, if one defines a color by a mix of 50% very saturated strong red as the red primary, one will get a more reddish color than the same R=0.5; G=x; B=x color definition in a set of primaries where the red is a feeble pink).

In fact, these constants a1, a2, a3 are uniquely determined, for each triplet of color defining primaries, as such constants which yield the exact (absolute, or typically relative having 1.0 for peak white) luminance in case one fills in the linear RGB components in Eq. 1.

The non-linear (primed) components are derived from the linear ones by applying an opto-electronic transfer function. For HDR this is a function with a steeper slope for the darkest linear input components than approximately a square root (Rec. 709 OETF of SDR), e.g. the Perceptual Qunatizer function standardized in SMPTE 2084.

In the LDR era there was not much debate, because for high end video one used only the Rec. 709 primaries, but now one also has e.g. the Rec. 2020, wide gamut primaries.

Cb then follows from Cb=b1*(B'−Y) and Cr=c1*(R'−Y), with b1, and c1 again constants fixed from the elected primary system (so as to not have overflow in the normalized to 1.0 representation).

The second question one needs to ask is how the non-linear R'G'B' are related to (in fact defined for) the linear RGB components. The linear components are easily determined for each to be additively created color (at least within the gamut of reproducible colors, e.g. inside the triangle of the three chromaticity locations of the elected primaries, in e.g. a standard CIE 1976 u'v' color plane; n.b. the primaries can be in principle chosen at will, but it makes sense to define images in such primaries which can also be displayed by actual displays in the market, i.e. not e.g. single wavelength laser primaries), namely this follows from elementary colorimetry (for any color—e.g. CIE XYZ or hue, saturation, luminance—one can calculate a corresponding metameric RGB triplet that a particular display having such primaries should display, to show the same color to an average observer).

The definition of the coding system, i.e. the so-called Electro-Optical transfer Function, or its inverse the Opto-Electrical transfer function which calculates the non-linear components from the corresponding linear ones, e.g.:

$$R'=OETF\_PQ(R) \qquad [\text{Eq. 2}],$$

is a technical question.

Note that one can also mathematically demonstrate that, even though one applies the OETF to a red, green and blue pixel color component, the luma and luminance are related via the same OETF (a colorless grey has R=G=B and R'=G'=B', so luminance L=(a1+a2+a3=1.0)*0.x and luma Y=1.0*OETF[0.x]=OETF[L]).

E.g., whilst in the LDR era there was only the Rec. 709 OETF, which OETF is (shortcutting some irrelevant details for this patent application) the inverse of the EOTF, and this was to a fairly good approximation a simple square root.

Then when the technical problem to code a large range of HDR luminances (e.g. $1/10,000^{th}$ nit-10,000 nit) in only 10 bit emerged, which is not possible with the square root function, a new EOTF was invented, the so-called Perceptual Quantizer EOTF (U.S. Pat. No. 9,077,994).

So this different EOTF definition, and any input YCbCr color defined by it, will clearly have different numerical normalized components depending on whether it is an YCbCr_Rec709, or an YCbCr_PQ (in fact, one can see this by turning the R'G'B' cube on its black tip, with the Y-axis of achromatic grey colors of different luma now forming the vertical: the various image pixel colors will then have different spreads along that vertical, depending on whether these same image object pixel colors are represented in a 709-based color cube, or a PQ-based color cube).

This given technical fact of YCbCr_PQ coding, will lead to new interesting experimental facts when being combined with the HDR codec which the present applicant has created together with Technicolor (see WO2017157977 and ETSI standard TS 103433-2 V1.1.1 "High performance Single Layer High Dynamic Range [SLHDR], Part 2"; and here in this patent application re-summarized with FIG. 1).

FIG. 1 shows our decoder which can ingest a YCbCr_PQ defined pixel color input image (Im_1), in which the pixels are being processed pixel after pixel in a scan-line.

So this image can come say e.g. from a blu-ray disk, with PQ normalized lumas corresponding to the PQ peak luminance of 10,000 nit. The shape of the functions which are needed to down-grade to e.g. an SDR image may come from a grader, human or automaton, e.g. (non-limiting) calculated when the movie of the disk is being transcoded.

The upper track of processing circuits (which are typically hardware blocks on a integrated circuit, and may be of various configuration, e.g. the whole luma processing sub-circuit 101 may in practice be embodied as a LUT, the so-called P_LUT (working in perceptually uniformized lumas), but also the sub-blocks may be embodied as separate transistor calculation engines of the integrated circuit and the like, but we need to explain it technically as what is in the blocks which generates both the technical benefits to the appearance of the image, as well as any possible technical problem, and in particular the one handled here below) concerns the luminance processing part of the pixel color.

This is of course the most interesting part of the dynamic range adjustment: when e.g. calculating from an input e.g. 1000 nit PB_C HDR image, a 600 nit output image, one needs to redistribute the various image object's normalized pixel lumas along the Y-axis of the YCbCr color space, namely typically the darker pixel lumas of the image will shift upwards towards the brighter (normalized) greys of the Y axis, thereby compressing the brighter pixel lumas into a smaller sub-range of the Y-axis. The bottom part of the circuit of FIG. 1 contains the chromatic processing, in particular of the color saturation of the pixels, because we want to keep the same hue in the input and output image, which for a good quality dynamic range conversion one should also take good care of.

In this particular elucidation embodiment, the output pixel color is also defined non-linearly with the PQ OETF (or inverse EOTF to be technically accurate), yielding non-linear R", G" and B" components directly transmittable to e.g. a HDR TV which expects such input (but with the correct color-mapped a.k.a. re-graded colors according to applicant's approach).

Some of the integrated circuit units are static, in the sense that they apply a fixed curve, matrix multiplication and the like, and some blocks are dynamic, in the sense that one can adapt their behavior. In particular, they may adapt the shape of their functions—e.g. how sharply a mapping function rises for the darkest input and how strongly it compresses the brightest inputs—potentially for each consecutive image of the video. Indeed, the problem with image processing is that there is always an almost infinite variability of the content (the input video may be a dark Hollywood movie of a burglary happening at nighttime, or a youtube movie where one follows the brightly colored computer graphics of somebody playing an on-line game, etc.; i.e. the input, though all encoded as YCbCr may vary considerably regarding its pixel colors and brightnesses in any image, whether the content was generated from a natural scene by any camera, professional or low quality, or was generated as graphics, etc.). So a nighttime scene may need a different mapping for the darkest luminances or in fact lumas of the input image Im_in than e.g. a sunny beach scene image.

Therefore some of the circuits (coarse dynamic range converter 112, customizable converter 113, and color lookup table 102 can apply variably-shaped functions, the shape of which is controlled by parameters from a source of image-related information 199. Typically this source is fed with images (Im_in) and metadata (MET), the latter comprising parameters which determine the shape of the various luma mapping functions which those dynamic circuits apply. This re-grading function metadata may be communicated from a content creation (encoder) side, communicated over any video communication network (cable, internet, etc.), and stored temporary in a memory in or connected to the decoder. The decoder can then apply those mappings that the creator of the video prescribed.

The pixel colors in the image come in as YCbCr_PQ, i.e. the non-linear R', G' and B' component all three being encoded with the Perceptual Quantizer function. The luma component is sent through the PQ EOTF which luminance calculation circuits 129 is configured to calculate (on achromatic grey colors this can be done without a problem, since those luma codes uniquely represent the various normalized luminances).

Subsequently this normalized luminance L is physchovisually perceptually uniformized by perceptualizer 111, yielding as output perceptually uniform luminances PY. This is performed by the following equations:

$$RHO(PB\_C\_HDR)=1+32*power[PB\_C\_HDR/10,000; 1/(2.4)]$$

$$PY=\log 10[1+(RHO(PB\_C\_HDR)-1)*power[L;1/(2.4)]]/\log 10[RHO(PB\_C\_HDR)]$$ [Eqs. 3]

We see in this perceptualization a dependency on the largest value codeable in the HDR input image, i.e. the largest (absolute) pixel luminance that can occur in the image (i.e. to be displayed), PB_C_HDR, which may typically also be communicated as part of the metadata (MET). In fact this gives already a quite reasonable distribution of image pixel lumas, and ultimately, when displayed, luminances, from a particular input peak brightness to an output peak brightness, but to have better quality graded images the content creator (encoding side) can continue re-mapping lumas in further configurable circuits (namely 112 and 113).

Subsequently, coarse dynamic range converter 112 applies a roughly good dynamic range reduction function, the shape of which is symbolically shown as a square root (an actual function which was found as useful by applicant consists of two linear segments the slope of which is configurable by metadata, with in between a parabolic segment, and the interested reader can find those details in the SLHDR ETSI standard as they are irrelevant for the present discussion), and this function calculates corresponding coarse lumas CY from the input perceptually uniform luminances PY of a currently processed set of pixels along an image scan. The idea is, and this will be sufficient already for many situations, that one relatively brightens the darker pixels of the HDR compared to the brighter ones, so that the totality fits in a smaller dynamic range.

Subsequently, customizable converter 113 applies a further electable (e.g. determined under control of a color grader or shader who is encoding a RAW captured video or movie at the content creation side, who will then communicate his elected function being most appropriate for the re-grading of this particular image or run of successive images from the video as metadata) luminance mapping function to the previously obtained coarse lumas CY to obtain perceptual output lumas PO. The shape of this mapping function can be determined at will (e.g. one may boost the contrast in a sub-set of luminances, corresponding to some important object or region in the image, by raising that part of the function above the trend for the rest of the function).

We will—as drawn—assume (non-limiting) this function to be an S-shaped function, i.e. with a relatively weak slope at the upper and lower input luminance sub-range, and a steep slope in the middle. The invention is not limited to S-shape functions applied by customizable converter 113, and is particularly useful for any scenario in which there is a changing slope behavior especially in a lowest sub-range of the input lumas (e.g. starting at 0.0 input value and ending at some value 0.x, typically below 0.5), e.g. the type which has a relatively low slope or average slope for the very darkest pixels, compared to slope for the brighter pixels of the lowest sub-range of the input lumas. One can consider the slope formulated from the starting point (0.0, 0.0).

Finally the perceptual output lumas PO (i.e. which have been fully luminance re-graded as the present image content would need, i.e. giving the best re-graded image corresponding to the input master HDR image (e.g. outputted as an output SDR image with a PB_C=100 nit), e.g. making the brightnesses and contrast look as close as possible as the visual impact they have in the master HDR image as far as the reduced dynamic range allows, or alternative at least yielding a decent looking or well-watchable image, etc.) are linearized again into normalized output luminances Lout, by linearizer 114, which uses the inverse equations of eqs. 3, but now with a PB_C_OUT value. We will assume for explanation purposes that the decoder down-grades the input HDR image to an SDR image, i.e. PB_C_OUT=100 nit (as agreed by standardization), but it can also down-grade to a e.g. 650 nit HDR output image, etc. (then the functions will have a somewhat different shape, but that display adaptation detail is also not useful to understand the present application's new technical principles, and can be found in said ETSI standard).

The lower track concerns the chromatic procession, or in other words the completion of the 3D color processing which belongs to the luminance processing (because in fact any luminance processing on color images is in fact a 3D color processing, whether one carefully treats the chroma components or not). This is where things become technically more interesting than the dynamic range changing behavior for achromatic colors on the axis of greys.

Where the luma typically quantifies the brightness of a color, Cr and Cb quantify its hue (the proportion of Cb/Cr) and its saturation (the magnitude of Cb and Cr). Formally Cb and Cr are chrominances.

Thereto, our codec processing circuitry has a color lookup table 102, which specifies a function of Y_PQ having a shape as elected and again configurable by metadata. So the processing of the chrominances is defined by both chrominances being multiplied by a same constant B, and this constant is a function of the luma Y_PQ of any processed pixel, and the shape of this function, i.e. each respective value of B(Y_PQ) for any possible Y_PQ, is also configurable.

The main purpose of this LUT would be to at least correct the too high or too low amount of the Cb and Cr components for a changed (dynamic range adjusted) normalized luma Y, because actually the Cb and Cr co-evolve with the luma in this color space representation YCbCr (the saturation of the color is in fact related to Cb/Y and Cr/Y), but other colorimetric aspects of the image could be changed with it, e.g. one could adjust the saturation of the bright blue sky. In any case, given a color LUT CL(Y_PQ) is being loaded for dynamic range processing at least the present video image, the color lookup table 102 will yield a multiplier B for each running/being color-processed pixel's Y_PQ value. The pixel's input chroma components Cb_PQ and Cr_PQ will be multiplied by this value B by multiplier 121 to yield the corrected chroma components CbCr_COR. Then a matrixing operation is applied by matrixer 122, the details of which can be found in the ETSI standard, to get normalized R'G'B'_norm components. These components are not normalized in the regular sense that they lie within the non-linear color cube between 0.0 and 1.0, but in the sense that they are dynamic range-less (all clustered together, just "chromaticities", as a trio instead of the usual duo, i.e. not with any luminance or luma yet). So to obtain an actual correct 3D color, they have to be multiplied by a luma, and precisely that luma which we optimally determined in the upper luma-processing sub-circuit. For this the normalized output luminance L_out needs to be mapped by a PQ OETF, which PQ OETF circuit 115 performs. Multiplier 123 does this correct multiplicative scaling of the three normalized R'G'B_norm components being output of the chromatic sub-circuit.

Finally the perceptual-quantizer-defined red, green and blue color components R"G"B"_PQ can be sent e.g. directly to a HDR display, which is constructed to understand such input, and it can directly display that input (e.g. the 650 nit PB_C output image may have been optimized by our technology to drive a 650 nit actual DISPLAY peak brightness PB_D display, so that this display does not need to figure out by itself how to handle differences between the luminance range encoded in the supplied images, and its displaying capabilities). Note that we elucidated a basic core technical element behavior here, to explain the present technical innovation. In the actual SLHDR decoder as standardized by ETSI there is also a black limiter circuit sub-unit, but that is not essential for the present approach ergo not essential for its explanation (the black limiter may or may not be present in various embodiments, ergo discussing about it in the introduction would produce more diffusion of the message than essential teachings, but for the interested reader we show that variant in FIG. 5). Note also that the coarse dynamic range conversion of coarse dynamic range converter 112 may in some embodiments be optional: one may set its shape control parameters so that it does an identity transform, and only apply the customizable mapping of customizable converter 113. There can be further modifications, like e.g. the output for a connected display, or storing the image, need not necessarily be in PQ YCbCr, but that complexity also deters from the core of our elucidating teachings.

This colorimetric optimization of the various images, although slightly complex because our various units were designed over the years to give the best approach for all situations and applications (e.g. off-line graded movie content versus real-time broadcasting, etc.), given various technical considerations and limitations, can now be understood, and also works quite satisfactorily on most of the many different input image situations.

However, there are a few somewhat exotic situations for which the color decoding can still be improved, as explained by means of figures FIG. 2A, FIG. 2B, FIG. 2C and FIG. 2D This problem will be handled with the new technical elements as taught.

FIG. 2A shows an ideal YCbCr color space, which one could form in case one uses instead of the luma Y as a vertical axis, the normalized luminance L. This color space is ideal in the following sense. A blue color of a certain hue lies in a triangular vertical section through this diamond shape. More saturated colors have a larger angle from the vertical, ergo color 201 is a blue of the same hue, but a less saturated pale blue, and color 202 is a more saturated blue. Both those colors may the same luminance, and this can be easily read of the vertical axis' luminance scale in the center (e.g. luminance level L1, versus L2). We can verify both differently colored pixels do have the same luminance, because the luminance of (pixel) color 201 and (pixel) color 202 is the same, namely L1.

In contrast with colorimetrically unique luminances, lumas however were never designed to be a perfect (easy to use, uniform etc.) color representation for human vision, but rather a system which makes it easy to code a triplet of colors into e.g. 3×8 bit, or nowadays for HDR typically 3×10 bit (w the reader is notified that this 3×10 bit can code HDR of not just a few times brighter than SDR, but up to 100× brighter and additionally also much darker!). So lumas and in particular YCbCr color representations were primarily designed for (reversible) coding, not for color processing.

This coding is in principle easily mathematically invertible, so one can always—as a coding system is supposed to have as its main property—re-derive the originally intended (linear) RGB components from the received YCbCr pixel color codings, and then display those. And one can also derive the luminance.

However, if one starts to do a (needed) more advanced decoding for the present HDR era videos, some inconvenient problems may occur. In fact, as shown in FIG. 3B, for chromatic colors (i.e. which are NOT pure greys, which pure greys fall on the vertical axis, having Cb=Cr=0 component values) the luma Y does not any longer correctly or uniquely code the pixel luminance (i.e. the luminance which immediately follows from applying eq. 1 on the original linear RGB components), i.e. it cannot be converted into the luminance by calculating L=EOTF(Y). In fact, for any elected fixed luminance value L of a color, the corresponding luma Y gets lower the higher the saturation S of the color is. In fact, a typical situation as illustrated with FIG. 2D is that if we have an object—say a purple flower—with more or less the same uniform illumination and hence more or less the same luminance for all pixels of the flower, but different saturations for the pixels, the tight almost single value histogram of pixel luminances 205 when mapped on the normalized horizontal axis of lumas (corresponding to vertical axis counts N(L_in)) gets a corresponding luma histogram 206 (counts N(PY)) which is not only positioned at a lower normalized (input) value, but also more spread. We can map the normalized (or absolute) luminances to a position on the luma axis defined by a given OETF, because we know that for achromatic pixels the luma Y uniquely corresponds to the normalized luminance (by remapping with the OETF shape: Y="L_in"=OETF(pixel luminance)).

This gives rise to several issues. Firstly we don't know exactly which luminance we have from only looking at the luma value Y, i.e. by applying the EOTF to Y, and this might already give problems in frameworks which do not handle the 3D colorimetry in a natural 3D manner, but for pragmatic reasons in a 1D+2D manner, like the decoder of FIG. 1. Indeed, in theory one can do everything correctly if one brings in the corrective dependency of the particular values for the pixel of Cb and Cr, but that may not be possible in some predesigned color processing topologies. Furthermore, as can be seen, we actually apply the luminance or brightness re-grading functions to the (perceptually uniformized) lumas, because already the input image is coded by pixel lumas, not luminances. So we might be doing something wrong, at least theoretically.

Nevertheless, this is normally not a (real) problem, which pragmatically looking at technology is not seen of sufficient error magnitude to be a reasonable concern, as was tested over the past years with many different kinds of image content. So one could argue that most of the time all goes well by simply doing the processing of FIG. 1, and if occasionally the output image is not perfect, then one will live with that issue.

But in a very specific conjunction of circumstances, one can see image artifacts which are significantly large to warrant an improvement solution, which is presented here below. This may happen when on the one hand one has very saturated colors (e.g. in Rec. 2020 one can make highly saturated colors; normally that wouldn't happen, since these colors hardly occur in real life, as most normal image colors will in such a saturated basis of color primaries will have more desaturated CbCr values, but at least it is possible theoretically), and on the other hand one elects not to apply only the smooth coarse luminance mapping function of coarse dynamic range converter 112, but also some more advanced function which has inconvenient bendings in it, like e.g. subsequently in customizable converter 113 also an S-curve which has low values for the output PO values corresponding to low input lumas CY (which would be incorrectly too low compared to their luminances as shown in FIG. 2D, and furthermore potentially differentially different for various points on the objects). I.e., especially changes in output color, and in particular luminance, along the object due to this total processing can be seen as problematic. Sadly the patenting system does not allow to include actual color images into a patent application specification, but FIG. 2C symbolizes what one would see e.g. in a saturated purple flower: there may be dark blotches 203 at certain places in the flower, or excessive visibility of microstructure 204, that would normally not be visible in the flower; not in the input image and not in the real world. A good looking flower would look reasonably smooth, or at least with gradually changing luminance, and not with such sharp and marked changes, which are due to some of the colors which are supposed to be color-processed equally jumping to different PY values which span over a point where such total luminance re-grading sufficiently significantly changes.

In FIG. 2D the differences between normalized (chromaticity-dependent) luma (PY) of pixels, as they would be received, and normalized luminance (or more exactly luminance-luma, i.e. the luma one would get on the achromatic axis, i.e. the correct luminance of a pixel of luma PY), L_in, are shown by there respective luma histogram 206 and luminance histogram 205 (N indicating the counts for each value). For a single pixel there would of course be one luma PY and one corresponding correct luminance L_in, but we show the spread for a number of pixels of an object of a particular average luminance and saturation, like e.g. the flower. We see that there may be only a few luminance values if e.g. a saturated purple flower is uniformly lit, but because there may be different color saturations in the flower pixels, the luma histogram may be more spread. In any case they are "incorrect"—as regards one-dimensional representatives of luminances. As will be shown below this can lead to processing errors in our SLHDR decoding approach, which will need to be counter-corrected, and specifically counter-corrected as taught and claimed.

One might theoretically consider to just build a better, different 3D-based decoding system, which might readily solve the issues, but in actual technically limited already deployed video ecosystem (with separate luminance processing and chromatic processing) this is not as easily done in practice. In any case, given we have such an encoder and corresponding decoder, to improve it also for the last minor inconveniences, specifically some incorrect luminance in saturated chromaticity objects, there are not so many things one can change, ergo trying to go for a pragmatic solution may involve quite some thinking and experimentation.

The following prior art documents have been found, and their tangential, insufficient significance is shortly discussed.

Some background teachings of interest of the present applicant are the following.

EP3496028 teaches another improvement of the basic luma processing and parallel chrominance processing encoding or decoding pixel pipeline of applicant, namely, under certain luma mappings some output colors, or in particular their lumas, may fall above the upper limit of the codeable color gamut. So a strategy is needed to keep them within the gamut, not afflicting the darker colors too much preferably. Thereto a particular mapping of the luma inwards to the highest regions inside the 3D color gamut is taught. Some of the luma downmapping may be interchanged for a saturation reduction, so that one needing down-map excessively, but one can also map towards the axis of neutral greys for a certain percentage of the needed luma downmap, thereby desaturating the brightest colors somewhat. In any case, this doesn't happen by means of a G_PQ calculation as in the present invention, and also on different color issues in another range of the color gamut.

Wo2017/157977 is concerned with particular luma processing for the darkest lumas in an image. E.g., a video content creator may wish to make the colors of the secondary image determinable from the primary master HDR image excessively deep for some dark pixels, which may affect the quality of inverse luma mapping for decoding. Thereto a parallel strategy of two alternative luma mappings is taught, in which a second, safer luma mapping can kick in for problematic desired luma mapping curves of the content creator. Beyond merely mentioning a standard means of chrominance mapping, that invention is not concerned with specific particulars of the chrominance mapping, as in the present application.

US2018/0005356 is about a particular roughly good luma mapping by means of a configurable linear slope for the darkest and brightest sub-range of HDR pixel lumas, with a parabolic smooth mapping in between. That luma mapping may or may not be applied in the luma processing track of our approach, but is not a teaching about chrominance processing with a color LUT.

SUMMARY OF THE INVENTION

The remaining problems with the SLHDR system for infrequently occurring image pixel colors can be mitigated by a high dynamic range video encoding circuit (300), configured to encode a high dynamic range image (IM_HDR) of a first maximum pixel luminance (PB_C1), together with a second image (Im_LWRDR) of lower dynamic range and corresponding lower second maximum pixel luminance (PB_C2), wherein the second image is functionally encoded as a luma mapping function (400) for decoders to apply to pixel lumas (Y_PQ) of the high dynamic range image to obtain corresponding pixel lumas (PO) of the second image, the encoder comprising a data formatter (304) configured to output to a video communication medium (399) the high dynamic range image and metadata (MET) encoding the luma mapping function (400), the functional encoding of the second image being based also on a color lookup table (CL(Y_PQ)) which encodes a multiplier constant (B) for all possible values of the pixel lumas of the high dynamic range image, which multiplier constants are for multiplication by chrominances (Cb, Cr) of the pixels, and the formatter being configured to output this color lookup table in the metadata, characterized in that the high dynamic range video encoding circuit comprises:

a gain determination circuit (302) which receives pixels of the high dynamic range image (IM_HDR), each pixel having a luma and two chrominances, configured to determine for each pixel a luma gain value (G_PQ) which quantifies a ratio of a first output luma for a luma equal to a normalized luminance of the luma of each pixel, divided by a second output luma for the luma of the pixel, wherein the first output luma is obtained by applying the luma mapping function to the normalized luminance, and the second output luma is obtained by applying the luma mapping function to the luma of the pixel;

wherein the high dynamic range video encoding circuit comprises a color lookup table determination circuit (303) configured to determine the color lookup table (CL(Y_PQ)) based on values of the luma gain value for various lumas of pixels present in the high dynamic range image, wherein the values of the multiplier constants (B) for lumas from at least a sub-set of the possible values of the lumas (Y_PQ) correlate with the value of the determined luma gain (G_PQ) for those lumas.

To be clear, this encoding circuit does not merely communicate a HDR image, but at least a corresponding secondary graded image, typically of lower dynamic range, and usually a standard dynamic range image of PB_C_SDR=100 nit. This ensures that receivers do not have to guesstimate what to do when receiving a high quality HDR image (IM_HDR) with a peak luminance PB_C far above the peak luminance capability of the display (PB_D) at the receiving side, luminance-mapping-wise. In fact, with the luma mapping function the content creator, e.g. his color grader, can determine specifically according to his desires how the receiver should map all luminances in the input HDR image towards the corresponding SDR luminances (e.g. a shadowy area in a dark cave should be kept sufficiently bright also in the SDR image, so that the man with the knife hiding there can still be sufficiently seen, not too conspicuous, but also not hardly visible, etc.). By communicating at least one luma mapping function (400) for each image—or a number of temporally successive images—the reader understands that with this function one can calculate one corresponding output luma (or luminance after linearization from whatever luma coding system the luma mapping was specified in, by a corresponding EOTF), to each input pixel luma. I.e. e.g. the input pixels are from a 2000 nit PB_C graded and encoded image (the encoding involving typically at least a mapping to YCbCr), and the output pixels are SDR image pixels (note that there will typically be metadata specifying which kind of image the function relates to, which according to SLHDR will be typically at least the PB_C_HDR of the HDR image, i.e. the e.g. 2000 nit). In fact, by communicating these two reference gradings, the receiving side will also understand to make images with a PB_C between the 100 nit and PB_C_HDR, by a process called display adaptation or display tuning, which involves specifying another luma mapping function from the luma mapping function as received from the content creator (see ETSI standard), but those details are not highly relevant for the present discussion, as the below elucidated principles will work mutatis mutandis. I.e. the metadata is the only information needed to functionally co-encode the secondary, different dynamic range (typically SDR) image, because receivers can calculate its pixel colors by applying said functions co-communicated in the metadata to the pixel colors of the actually received YCbCr pixel color matrix image, IM_HDR.

The inventor realized that as a first step a luma gain value (G_PQ) can be calculated, in the PQ domain, which quantifies how much the luma value has gone down for the specific chromaticity compared to the value on the achromatic axis (i.e. where the luminance of the present color can be uniquely determined by applying the PQ EOTF to that achromatic luma value), because the chromatic color is supposed to have the same luminance, and luminance-luma as readable on the achromatic axis, as such a corresponding grey color which has the chromas set to zero, see FIG. 2B.

The inventor further experimentally realized that quite satisfactory results can be achieved by applying this same luma gain value to the chromas of the pixel. This may give some saturation error for the color, but that is far less conspicuous than the original luminance errors, and in practice acceptable for the images having such high color saturation object problems.

Correlation means that, if one sees scattered value of the luma gain value (G_PQ) for any particular value of the possible values of Y_PQ (which typically are normalized i.e. fall between 0 and 1, with some precision step, corresponding to the nr. of color LUT entries, or a number of luma entries), the value of B for that position in the color LUT will be roughly the same as where the G_PQ values lie. Various algorithms can determine how roughly the shape of the color LUT, i.e. the function of the variable values of B as function of Y_PQ (B[Y_PQ]), will spatially collocate with the scattered cloud of G_PQ values. E.g., on the one hand one may contribute to the scatter plot only a (geometrical) sub-set of the pixels of the image, and their corresponding Y_PQ and G_PQ values (e.g., there may be a detector of where specifically in the image significant artifacts of the type as elucidated with FIG. 2C occur, and only those pixels may contribute and the other may be discarded, or at the encoding side the selection of contributing pixels may be determined also by the human content creator. On the other hand it is not necessary that one determines the entire color LUT shape by this means, e.g. one can only determine it for a sub-set of lumas being the bottom half [0, 0.5], or where a significant amount of scattering occurs, and the other half may be determined by other algorithms, e.g. be fixed. The sub-set of lumas that gets changed may be related to the geometric sub-set of pixels contributing, in case not all pixels are used. On the decodings side, since the determination of the color LUT may correspond to a deviation of the originally co-communicated color LUT, the correlation may also take into account this original color LUT, i.e. the finally determined LUT to be applied to all input HDR image pixels to obtain the output image may deviate from e.g. an average position in the cloud of (Y,PQ, G_PQ) points. The determination may also be restricted to some sub-set of chrominances, in which case one gets another well-working corrected color LUT.

Chrominances are sometimes also called chromas. The (correct) luminance corresponding to any luma can not only be calculated, but also positioned on the range of lumas, because both are normalized to 1.0.

In case of an encoder, a well-working color LUT will typically be communicated for receiving-side decoders to simply apply it. The content creator may e.g. check whether the correction sufficiently works, for one or more displays at his side.

A useful embodiment of the high dynamic range video encoding circuit (300) has the color lookup table determination circuit (303) determine the values of the color lookup table based on a best fitting function summarizing a scatter plot of values of the luma gain value (G_PQ) versus corresponding values of the high dynamic range image pixel luma (Y_PQ). A number of fittings can be equally applied, e.g. a function which roughly goes through the middle of the point cloud of (Y_PQ, G_PQ) points will do satisfactorily. One can design other functions according to the same innovative principles, e.g. different functions for different hue regions, in case the decoder has such a hue classification mechanism, etc.

Advantageously the high dynamic range video encoding circuit (300) further comprises a perceptual slope gain determination circuit (301) configured to calculate a perceptual slope gain (SG_PU), which, in a coordinate system of perceptual uniformized lumas of horizontally high dynamic range image lumas (PY) and vertically output image lumas (PO), corresponds to a percentual increase of an output luma (Y_o1) obtained when applying the luma mapping function (400) to a luma of the high dynamic range image pixel (YT), to reach a corrected output luma (Y_corr1) for the high dynamic range image pixel (YT), which corresponds to a division of an output luma (L_o1) obtained by applying the luma mapping function (400) to an input luma (L_e1) which equates with a position of a normalized luminance corresponding with the high dynamic range image pixel (YT), divided by said input luma (Le) and multiplied by the high dynamic range image pixel (YT). This is a manner to linearize the corrected behavior of the non-linear luma mapping function, by giving the too dark luma colors at least the same slope as one would have by drawing the line from the corresponding correct luminance input and output point to the (0,0) point.

The principles of correction can also be embodied in a high dynamic range video decoding circuit (700), configured to color map a high dynamic range image (IM_HDR) having a first maximum pixel luminance (PB_C1) to a second image (Im_LWRDR) of lower dynamic range and corresponding lower second maximum pixel luminance (PB_C2), comprising a luma mapping circuit (101) arranged to map a luma (Y_PQ) of a pixel of the high dynamic range image (IM_HDR) with a luma mapping function (400), and a color mapping circuit which comprises a lookup table (102) arranged to output a multiplier value (B) for each pixel luma (Y_PQ), to a multiplier (121) which multiplies chrominance components (CbCr_PQ) of the pixel of the high dynamic range image (IM_HDR) by the multiplier value (B), characterized in that the video decoding circuit comprises:

a gain determination circuit (302) configured to determine for each pixel of a set of pixels of the high dynamic range image a luma gain value (G_PQ) which quantifies a ratio of an output luma for a luma equal to a normalized luminance for the luma (Y_PQ) of the respective pixel, divided by an output luma for the luma (Y_PQ) of the respective pixel; and a color lookup table determination circuit (303) configured to determine a color lookup table for the lookup table (102) specifying multiplier constants (B) as output for various input luma values, wherein values of at least a sub-set of the multiplier constants (B) of at least a sub-set of the possible values of the lumas (Y_PQ) are determined based on values of the luma gain (G_PQ) for those lumas.

The same principles can be applied in a decoder, in case the encoder for whatever reason has not performed the error mitigation in its co-communicated CL(Y_PQ) LUT. Thereto the decoder will calculate the corresponding luminances, and luminance-lumas, from the received YCrCb_PQ colors. It can then decode a received HDR image to any functionally co-encoded secondary image of different dynamic range, e.g. the SDR 100 nit PB_C_SDR image. The decoder will use the same new technical elements to fill in the appropriate luma error mitigating CL(Y_PQ) lookup table in the corresponding LUT 102 of the color processing circuit of the SLHDR decoder.

Useful is also a method of encoding a high dynamic range video, configured to encode a high dynamic range image (IM_HDR) of a first maximum pixel luminance (PB_C1), together with a second image (Im_LWRDR) of lower dynamic range and corresponding lower second maximum pixel luminance (PB_C2), wherein the second image is functionally encoded as a luma mapping function (400) for decoders to apply to pixel lumas (Y_PQ) of the high dynamic range image to obtain corresponding pixel lumas (PO) of the second image, comprising outputting to a video communication medium (399) the high dynamic range image and metadata (MET) encoding the luma mapping function (400), the functional encoding of the second image being based also on a color lookup table (CL(Y_PQ)) which encodes a multiplier constant (B) for all possible values of the pixel lumas of the high dynamic range image, which multiplier constants are for multiplication by chrominances (Cb, Cr) of the pixels, and the color lookup table also being output in the metadata, characterized in that the high dynamic range video encoding comprises:

receiving pixels of the high dynamic range image (IM_HDR), each pixel having a luma and two chrominances, and determining for each pixel a luma gain value (G_PQ) which quantifies a ratio of a first output luma for a luma equal to a normalized luminance of the luma of each pixel, divided by a second output luma for the luma of the pixel, wherein the first output luma is obtained by applying the luma mapping function to the normalized luminance, and the second output luma is obtained by applying the luma mapping function to the luma of the pixel;

wherein the high dynamic range video encoding comprises determining a color lookup table (CL(Y_PQ)) based on values of the luma gain value for various lumas of pixels present in the high dynamic range image, wherein the values of the multiplier constants (B) for lumas from at least a sub-set of the possible values of the lumas (Y_PQ) correlate with the value of the determined luma gain (G_PQ) for those lumas.

Useful is also a method of high dynamic range video decoding, to color map a high dynamic range image (IM_HDR) having a first maximum pixel luminance (PB_C1) to a second image (Im_LWRDR) of lower dynamic range and corresponding lower second maximum pixel luminance (PB_C2), comprising forming the second image by mapping lumas (Y_PQ) of pixels of the high dynamic range image (IM_HDR) with a luma mapping function (400) to obtain as output of the function lumas of the second image, wherein the color mapping further comprises obtaining chrominances of the second image by multiplying chrominance components (CbCr_PQ) of the pixels of the high dynamic range image (IM_HDR) by multiplier values (B), which multiplier values (B) are specified in a lookup table (102) for various values of the lumas (Y_PQ) of the pixels of the high dynamic range image (IM_HDR), characterized in that the video decoding comprises:

determining for each pixel of a set of pixels of the high dynamic range image a luma gain value (G_PQ) which quantifies a ratio of an output luma for a luma equal to a normalized luminance for the luma (Y_PQ) of the respective pixel, divided by an output luma for the luma (Y_PQ) of the respective pixel; and determining the color lookup table by calculating the values of at least a sub-set of the multiplier constants (B) of at least a sub-set of the possible values of the lumas (Y_PQ), based on values of the luma gain (G_PQ) for those lumas.

The present novel techniques allow improved re-graded, i.e. in particular down-mapped for lower peak brightness, images, in case the video content creator makes some problematic luma mappings, whilst not creating problems for other situations. The G_PQ values as calculated can be implemented, largely, as an additional saturation processing in the chromatic path, by correlating the values of the B-constants, as defined as Y_PQ-dependent outputs of the color LUT, with the values obtained from the G_PQ calculation. I.e. the single B-value per Y_PQ follows roughly the location of the scatter of the G_PQ values, by some pre-engineered metric of co-location in the encoder, or decoder.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes or dots are used to indicate that a component is optional, non-dashed components not necessarily being essential. Dashes or dots can also be used for indicating that elements, which are explained to be essential, but hidden in the interior of an object, or for intangible things such as e.g. selections of objects/regions (and how they may be shown on a display).

In the drawings:

FIG. 2A schematically illustrates an ideal YCbCr color space;

FIG. 2B schematically illustrates that a luma Y does not any longer correctly or uniquely code the pixel luminance;

FIG. 2C schematically illustrates what blotches one would in a saturated purple flower;

FIG. 2D; schematically illustrates differences between normalized luma (PY) of pixels, as they would be received, and normalized luminance-luma;

FIG. 1 for determining the color LUT for determining the constants B for multiplication by the chrominances.

DETAILED DESCRIPTION OF THE EMBODIMENTS

Figure 3:
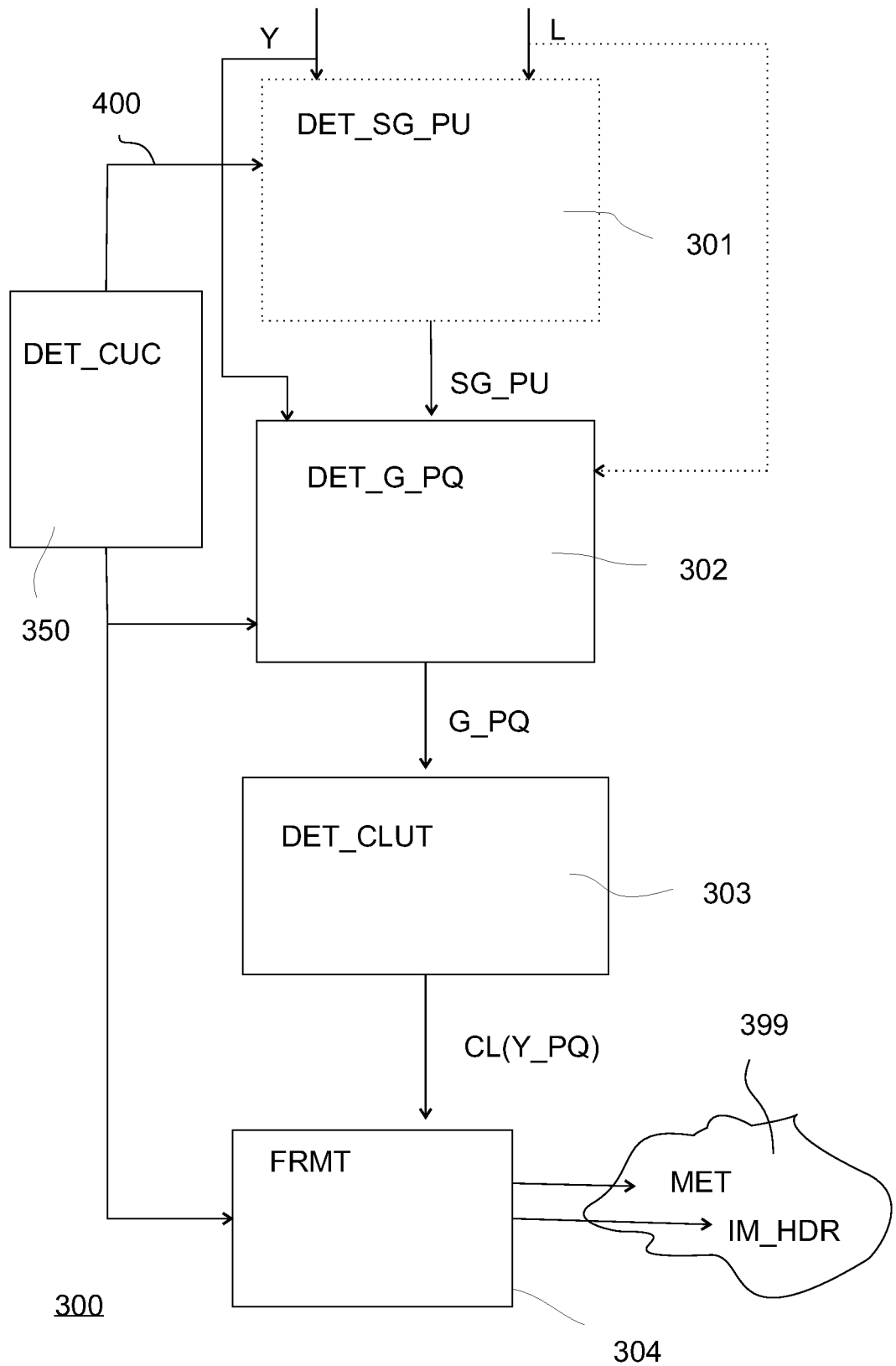
FIG. 3 schematically shows a new manner to do SLHDR encoding according to the present innovative principles, and a corresponding HDR video encoder 300; in particular it shows a part of an encoder topology similar to e.g.

FIG. 3 elucidates how the modified encoder, compliant with our SLHDR HDR video encoding approach, works. At the encoding side one has, as input, the original master HDR image (e.g. a 5000 nit PB_C image as graded by a human color grader so that all objects in the various video images like e.g. bright explosions and dark shadowy areas in caves look optimal) available, so one has both the pixel luminances (L) and the corresponding lumas (Y) available. There is a luma mapping function determination circuit 350 comprised (or connected), which can determine the optimal e.g. S-shaped luma mapping curve as shown in and discussed with FIG. 4 (i.e. of circuit 113 in FIG. 1). Note that whereas we elucidate the principles with this S-shaped mapping function, the processing is generic whatever the function (it may even work on situations where it doesn't improve, but also not deteriorate). We needn't elaborate on the many ways in which this can be done by various embodiments developed by applicant, but e.g. this may be done by an automaton, which analyzes the lumas present in the master HDR input image (which will ultimately be communicated as IM_HDR to receivers), and determines an optimal function (e.g. S-curve) for such a distribution of lumas, or in other physical embodiment of encoding apparatuses it may be configured via a user interface like a coloring console by a human color grader. The three arrows out of the luma mapping function determination circuit 350 deliver the determined luma mapping function 400 to the respective other circuit circuits, e.g. it will be used by perceptual slope gain determination circuit 301, of which a typical working embodiment is taught with FIG. 4. Note that whereas typically embodiments may work in the Philips perceptual domain defined by Eqs. 3, this is not a necessary element of our innovation, which in some embodiments may be directly formulated with a PQ gain, ergo circuit 301 is drawn dotted indicating optionality. Ultimately, a data formatter 304 will communicate all data which encodes at least two differently graded images (one of them being communicated as an actual image of pixel colors, IM_HDR, e.g. DCT compressed as in an MPEG or similar video coding standard, like e.g. AV1) based on the master HDR image to receivers. Namely, it will output to any video communication medium 399 (which can be e.g. a wired connection, such as e.g. a Serial digital interface (SDI) cable or HDMI cable, or an internet cable, a wireless data connection such as e.g. a terrestrial broadcasting channel, a physical medium for transmitting video data such as a blu-ray disk, etc.) an encoded and typically compressed version of the master HDR image, namely high dynamic range image IM_HDR, at least one luma mapping function for receivers to apply (when re-grading to different, typically lower peak brightnesses), and a color lookup table (CL_(Y_PQ)), the latter two as metadata (MET), depending on the used video communication protocol being e.g. SEI messages. The color lookup table serves to deliver for each lookup position Y_PQ (of a pixel) a value B, for multiplying by the two chrominance values Cb and Cr of any pixel.

Figure 4:
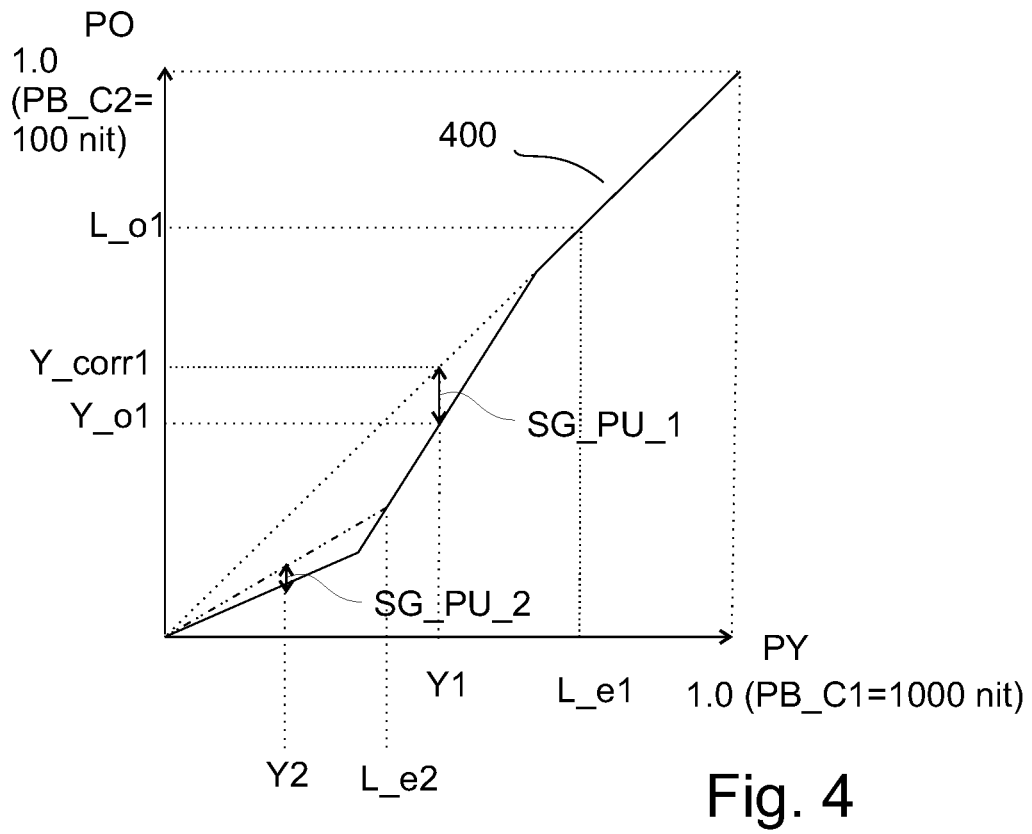
FIG. 4 schematically illustrates some principles according to which one can embody the present approach as contemplated by the inventor, and specifically an internal functioning of an embodiment of a perceptual slope gain determination circuit 301 according to the present invention's principles.

FIG. 4 shows the mapping applied to the HDR input lumas (as represented in the perceptually uniformized domain where the SLHDR luma mapping is specified), to obtain in this case SDR output lumas. The perceptually uniformized lumas are normalized, i.e. the value 1.0, on the vertical axis corresponds to SDR peak brightness PB_C2=100 nit, and on the horizontal axis the 1.0 corresponds in this example to a master HDR image peak brightness PB_C1 of 1000 nit, of the high dynamic range image (IM_HDR). This is a useful manner of describing luma mappings, e.g. it gives a human color grader a better control than when the mapping is specified natively in the luminance domain (the skilled reader understands that only the shape of any luma mapping function would change, in a predictable manner, if one quantified the axes differently). In this elucidation example we have skipped the coarse luma mapping of the coarse dynamic range converter 112 (and also other processing our codec allows like the black/white stretch and gain limiting illustrated in FIG. 5), and the luma mapping consists entirely of this S-curve (such a curve may happen e.g. if there is a rather bright scene, of which one wants to do a contrast stretch in the darker parts, which makes the output SDR image look better).

Let's look at the color of a certain pixel, e.g. a saturated magenta color, which has a luma YT. If this luma is mapped by luma mapping curve 400, an output luma Y_o1 results (similarly for another pixel with input luma Y2). This may be a relatively dark output result (because it should be borne in mind that perceptually uniformized axes are somewhat logarithmic in nature). What actually should have been better, if one were to map the "luminance" instead of the luma, or technically more exact the luma (or position on the horizontal axis) which uniquely corresponds to the luminance, L_e1 (which can be the exact luminance-luma [which is the luma which uniquely corresponds, via the OETF, to a luminance] at the encoder side, because the encoder has all information available), is that one would obtain an output luma of L_o1 i.e. brighter than Y_o1. I.e. this L_e1 is the luma axis value that this colorful pixel of this image object should have had, if there was no strong luminance-leak in the luma representation (of e.g. PQ, or Philips perceptually uniformized lumas), en lieu of its actual luma Y1.

Indeed, for the achromatic greys, since on that axis there is no chromaticity-dependent luma loss, and the EOTF (luma) equals the luminance, uniquely and exactly, one would indeed map according to this luminance-luma L_e1 (i.e. one would follow for neutral/achromatic and near neutral colors in the image such a preferred re-grading, e.g. to make some nice deep blacks). Furthermore, as was indicated with FIG. 2D, there can be a considerable spread in luma values (Y1 versus Y2), for colors that were originally similar, in that they originally had nearly the same luminances, and then in addition for such a highly non-linear S-curve one of the lumas may jump to the highly differing mapping part of the function, e.g. the small sloped linear part which maps the darkest input lumas versus the high slope middle part.

So on the one hand it was seen that there is a problem of too dark output colors in highly saturated objects, so there should be some brightening applied (to certain image colors at least). Furthermore the inventor experimentally discovered that for linear curves there is no significant visual disturbance (even if there is some error, it is not a visually important one).

But one cannot simply change this luma mapping function 400, because this is key metadata determining how a secondary image needs to be re-graded (according to the content creator) from the image as received (IM_HDR); to e.g. a 100 nit PB_C_SDR SDR image. As said, this luma mapping function is exactly correct for the achromatic and near neutral colors, so if one were to change it those colors would be suddenly incorrectly luminance-re-graded, and those are usually the more critical colors, like e.g. face colors. On the other hand, in many scenarios the function also works sufficiently as desired on the non-achromatic colors.

Returning to FIG. 3, the perceptual slope gain determination circuit 301 simply determines a "situation characterizer value", namely a perceptual slope gain SG_PU, which is determined as:

$$SG\_PU=(L\_o1/L\_e1)/(Y\_o1/Y1) \qquad [\text{Eq. 4}]$$

I.e. it is the ratio of two slopes: firstly the output luma, as obtained by applying the luma mapping curve to the (substantially or exactly) correct luminance representing luma value L_e1, divided by that luminance-luma L_e1; and divided by secondly the ratio of the output luma for the input luma for that specific color pixel Y1 (of the input image) divided by that input luma Y1. Substantially or exactly the correct luminance position refers to the fact that in some embodiments one may determine exactly the luminance, and in other embodiments one may want to estimate it (which an be done in various ways), but we shall continue with "the normalized luminance" (and represented in the specific Philips perceptual uniformized range), and the reader may assume it is the exactly correct luminance value (e.g. the one that the video creator graded, and that one can e.g. calculate by applying eq. 1 to the linear RGB coefficients of the pixel of image in the computer).

Figure 1:
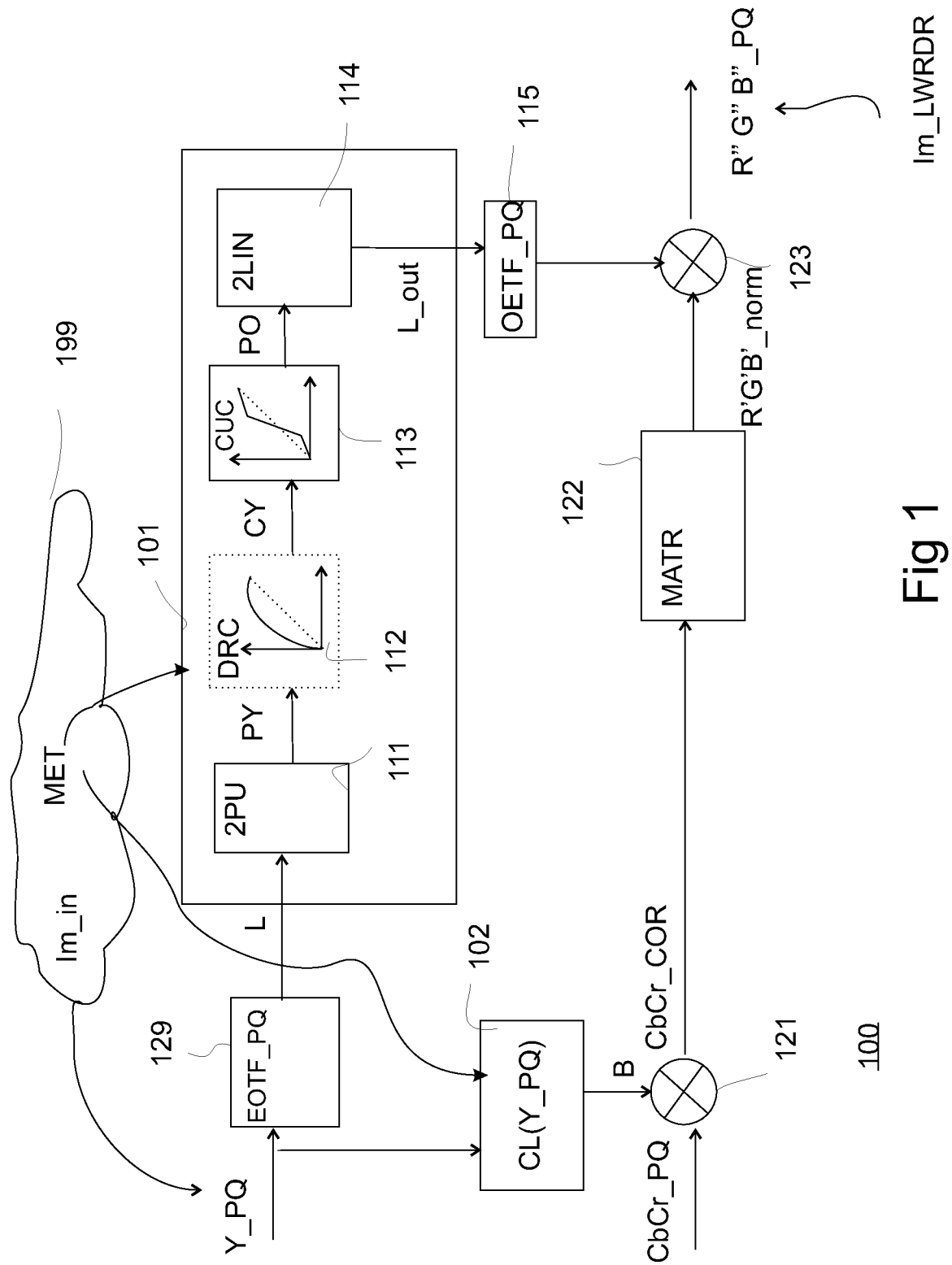
FIG. 1 schematically illustrates a HDR image decoder of applicant according to the so-called Single Layer HDR image decoder (SLHDR) as standardized in ETSI TS 103 433-2 V1.1.1; note that an encoder typically may have the same topology of image processing circuits as the corresponding decoder, potentially with the mapping function shapes adjusted (since the decoding goes in the same downgrading direction as how the encoder determines such downgrading functions to be applied by decoders, shape aspects like the convexity may be the same for encoding and decoding, but depending on to which output peak brightness one wants to map the lumas, a co-communicated luma mapping function of e.g. $\frac{1}{7}^{th}$ power may be applied in the decoding as $\frac{1}{4}^{th}$ power).
Figure 5:
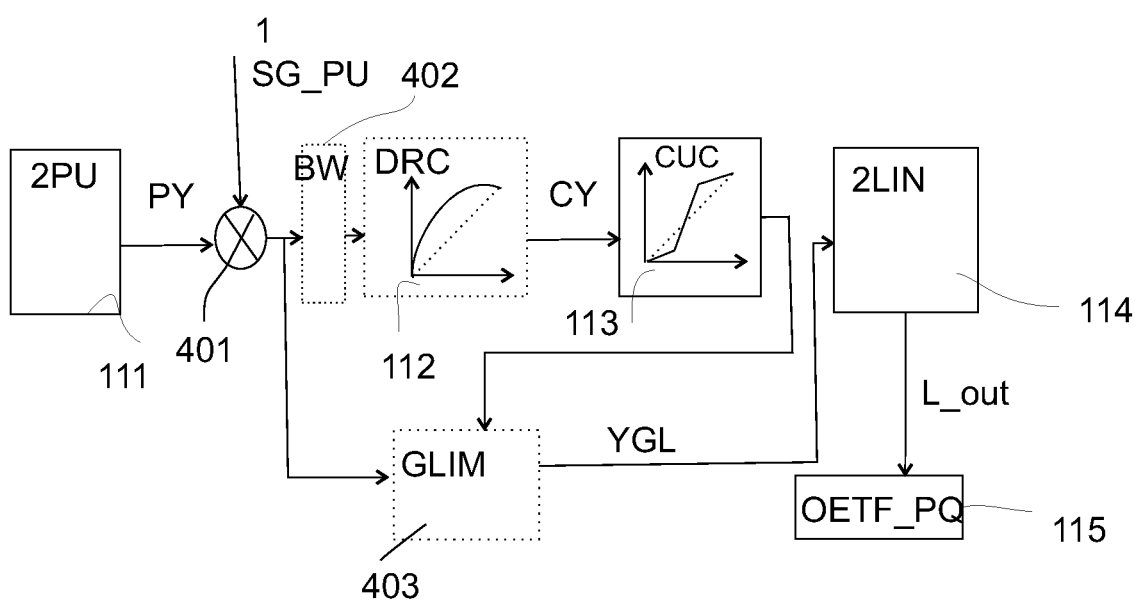
FIG. 5 schematically illustrates how an embodiment of the gain determination circuit 302 works, namely by sending a pixel color twice through at least some of all the shown luma processing circuits, with different multiplier constant for multiplier 401.

In FIG. 5 we show an embodiment of the gain determination circuit 302, in which this perceptual slope gain SG_PU is used. What is ultimately needed is a correction in the PQ domain (of U.S. Pat. No. 9,077,994 and standardized as SMPTE ST.2084), as can be seen in FIG. 1, whereas all luma mapping of at least the SLHDR decoder happens in the perceptually uniform (PU) domain (of above Eq. 3). The inventor realized he could tackle the problem quite decently by an adjustment for the chromas (and in encoders a determination of the color lookup table CL(Y_PQ) to be communicated to receiving-side decoders). I.e. this can be a changed color lookup table when the grader has already defined an initial one. I.e. everything in luma mapping sub-circuit 101 happens in the PU domain, but the input Y_PQ and CbCr_PQ are in the PQ domain.

So one must actually according to the present approach determine a correction for the errors of the blotches and other too dark parts of saturated image objects in the PQ domain, which is what circuit 302 performs. In an exemplary embodiment it runs two passes (for each pixel color of the image), controlled by a multiplier with a switched multiplication value. Note that the skilled person can by himself understand implementation details like e.g. buffering, providing an image delay, etc.

First this value is set to 1, and then the input luminance L (which can be calculated from the input luma Y_PQ by applying the PQ EOTF to it) is again converted to the perceptually uniformized luma domain, i.e. converted into an equivalent, representative, perceptual luma value PY. So the total mapping behavior will apply for the pixel(s) of this pass on what is shown in FIG. 2D to be the PY value.

In fact, the blocks of this unit correspond to what was explained with FIG. 1, and also FIG. 4 of the ETSI TS 103433-2 V1.1.1 standard). The newly drawn blocks are a black and white level offsetter 402, which may shift a certain constant value of the input HDR lumas to the 0 respectively 1 value of the perceptually uniformized representation. E.g. if the HDR goes no darker than 0.1 nit (or whichever luma representation value equivalent thereto), it is often advantageous to pre-map this value already to the lowest SDR value zero, before applying further luma mapping, and the same with a highest value. The gain limiter 403 is a circuit which kicks in under certain circumstances, and determines the maximal value between what results from applying the various processing steps in the upper track (i.e. circuit 402, 112, 113 etc.), and an alternative luma mapping strategy, so that the output lumas in the image which results from applying this luma mapping to all pixels of the input image do not become too low (see ETSI standard for details; what one needs to know for the present innovation is only that one applies all of the processing that one would apply under normal circumstances for classical SLHDR luma mapping without the present invention, i.e. if there is e.g. a coarse mapping applied, so would it be applied by circuit 302, and if not then circuit 302 exactly similarly also does not apply it).

So in the first pass, when setting the multiplier to 1, the normal output luma Y_o1 comes out, for a pixel luma input Y1 (or similarly a corresponding output luma for any other input luma such as Y2). Note that this Y_o1 value is still in the perceptually uniformized luma domain (PO) so it must still be linearized (by linearization circuit 114) by the inverse of Eqs. 3 and then PQ domain-converted (by circuit 115).

In the second pass the multiplier multiplies the perceptual luma PY by the perceptual slope gain value SG_PU (as determined by circuit 301), and then a corrected value comes out, shown as Y_corr1 in FIG. 4. This corresponds to applying our calculation of the (true) normalized luminance, looking up what slope exists in the total mapping curve for that position (L_e1, L_o1), and using it to locally increase the slope, and output for Y1. In fact, gain determination circuit (302) calculates a PQ-domain luma gain value (G_PQ) as:

$$G\_PQ = OETF\_PQ[Inv\_PU(Y\_corr1)]/OETF\_PQ[Inv\_PU(Y\_o1)] \quad [\text{Eq. 5}]$$

In which Inv_PU standard for the inverse of the perceptual uniformization of Eqs. 3, i.e the calculation of corresponding (linear) normalized luminances.

I.e. G_PQ is the ratio of obtained output luma (in the PQ domain) when sending an uncorrected (i.e. as received) luma value through our entire SLHDR luma processing chain, and a corrected PQ-domain luma, which corrected PQ-domain luma is the luminance-luma i.e. the EOTF(Y1), through the luma processing chain. Note that, at the encoding side, there can be a few alternatives to build the encoder, e.g. one can directly calculate the G_PQ value from the actual chromaticity-dependent luma (i.e. as it will get encoded in the encoder's output image IM_HDR) and the correct (achromatic) luminance representing luminance-luma, i.e. circuit 301 is not an essential core technical element of our innovation and may be absent in some encoder embodiments (see the dotted line in FIG. 3 which shows that in such a case circuit 302 would do its two calculations with as input the luma Y and the luminance-luma L respectively, and there being no multiplier or it being set to 1× in both situations).

This G_PQ value will now be used by lookup table determination circuit (303) in its determination of a corresponding color LUT CL(Y_PQ). There can be several ways to do this (depending on what one wants to achieve: there is only one shape of the LUT function that can be determined for the situation, but instead of focusing e.g. on overall behavior, one may specifically focus on certain aspects, like particular colors in the image, etc.), which can be illustrated by one archetypical example in FIG. 6. In fact, one would ideally like to do the correction for each pixel specifically, but that is not how the SLHDR approach works (due to the simplification by the 1D-2D processing split). The idea is that one wants to boost the saturation of (at least) the pixels where the luma processing artifact occurs. Then the lower luma corresponding to such a higher chroma will get reconverted to a higher luminance in the output R"G"B" color. The disadvantage is that there is some saturation change between the input and output colors, but that is acceptable, also because the eye is more critical to luminance than saturation variations, and also because luminance re-adjustment is the more important visual property in dynamic range adjustment. In any case, the regularization (although it may "globally" tweak the colors somewhat), removes or mitigates the nasty localized artefacts, like the blotches in the flowers of FIG. 2C, and that is why the present arrangement of calculations is performed.

Figure 6:
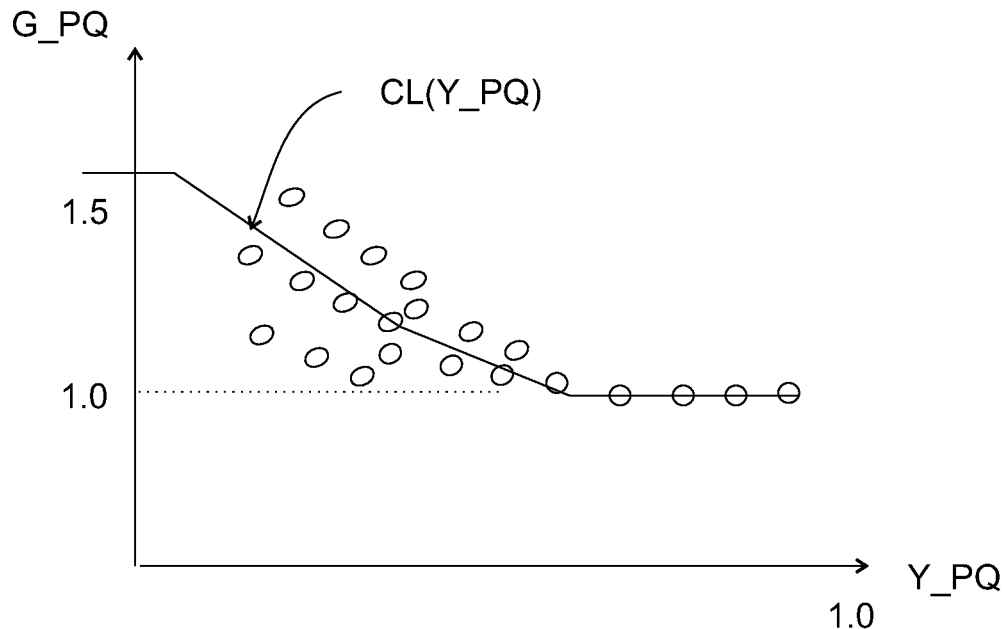
FIG. 6 schematically illustrates how the color lookup table determination circuit 303 can determine a function which codes the B multipliers for each Y_PQ value to be loaded in the LUT 102 from the various (Y_PQ, G_PQ) values as calculated for the pixels in the input HDR image by circuit 302 (there are other manners of determining the LUT)

FIG. 6 shows how we can (on average) determine a correction strategy, by determining a fitting function to the data points calculated by circuit 302 (i.e. for any pixel in at least one specific image of the video, with Y_PQ, but also Cb and Cr values, which G_PQ value comes out). I.e., circuit 302 gets e.g. all (or some; e.g. in case only certain affected pixels are detected, and contributing to the algorithm, i.e. the Color LUT determination) pixels of an image, and calculates by the above elucidated technical process G_PQ values. When one organizes those in a 2D plot structure, one sees that for any single value several needed (for the respective pixels) G_PQ values can result (especially for the lower Y_PQ values). The plot of FIG. 6 shows the various (Y_PQ, G_PQ) values that come out of circuit 302. One typically sees no spread for high lumas Y_PQ (there being a multiplier constant 1 equating with no correction). In the lower region, which typically corresponds to the saturated colors (or dark unsaturated colors) there is a spread of the G_PQ values for each Y_PQ position, because of the various Cb, Cr values that pixels with a certain Y_PQ can have. The Color LUT, CL(Y_PQ) from FIG. 1 also has a behavior which can be shown in this plot: it determines boost values for each Y_PQ value, so if one equates the B with the G_PQ as calculated above for the luma processing track (but whilst calculable not changeable in the luma track) one can draw a function corresponding to the values filled in the 1D color LUT CL(Y_PQ). The skilled reader knows that there exist various manners on how to fit a function to a cluster of points. E.g. one can use the minimization of the mean squared error.

If this functionality is applied on the encoder side, basically only the color LUT has to be determined (as shown in FIG. 3), then this color LUT gets communicated to receiving sides, and then the decoder can simply apply it. That is one elegant manner of embodying the present principles.

However, the same process can also be applied on the decoding side (when not already applied at the encoding side), but it will have a few small differences. However, what will stay the same is that each time a luminance re-grading needs to happen, multiplier 121 will counter-correct the chroma components for the luma issue, by calculating:

$$Cb\_COR = CL(Y\_PQ) * Cb\_PQ \text{ and } Cr\_COR = CL(Y\_PQ) * Cr\_PQ \quad [\text{Eq. 6}]$$

Figure 7:
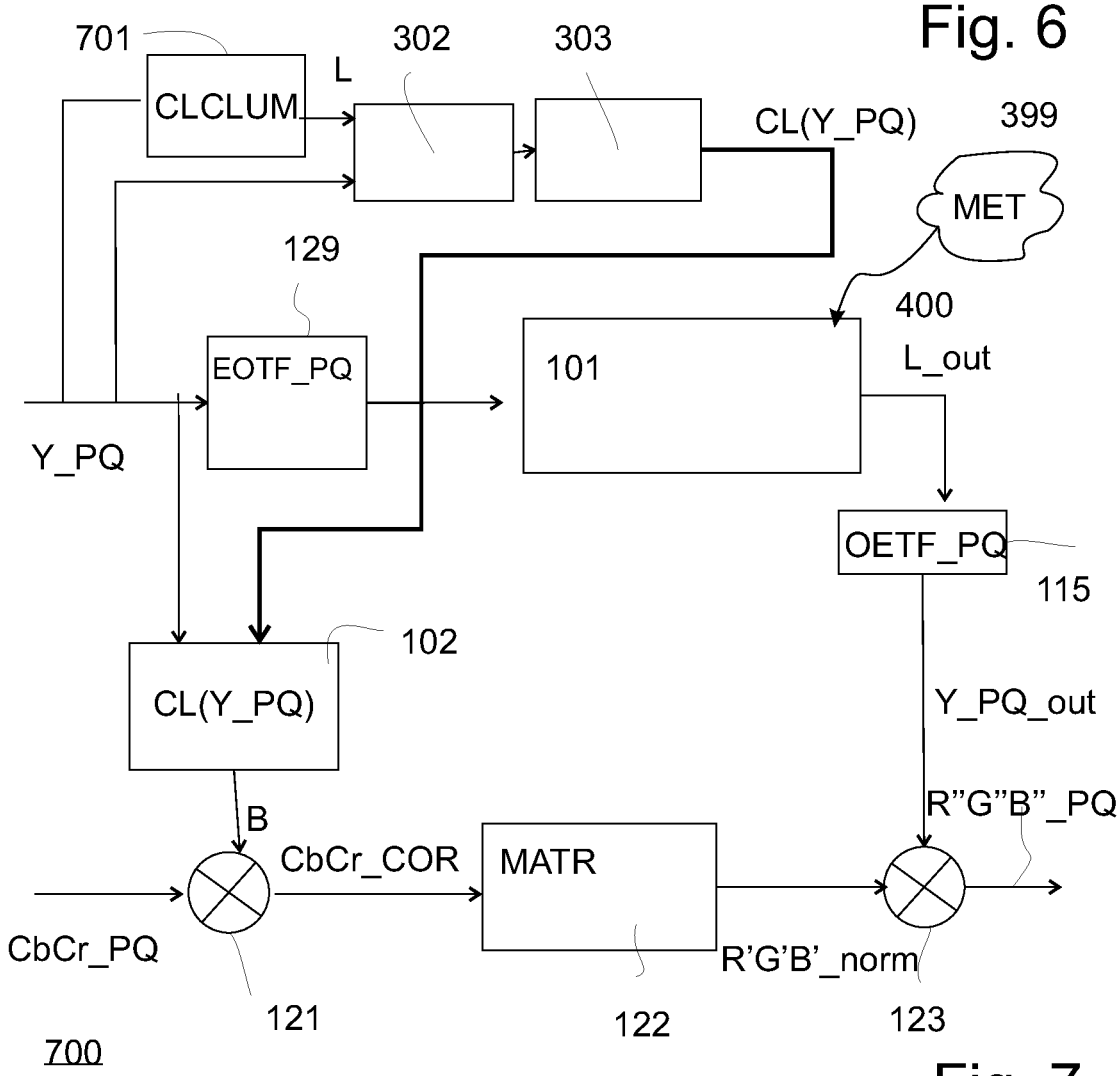
FIG. 7 schematically illustrates a HDR video decoder 700 which is configured to apply the same innovative processing as encoder 300, on the receiving side of SLHDR-coded HDR video data.

FIG. 7 shows a decoder 700 according to the present invention. Basically almost all the blocks are the same as in encoder 100 of FIG. 1. In particular the gain determination circuit 302 has to determine a set of luma gain values (G_PQ) again for at least the artefact-damaged pixels, which again quantify a ratio of an output image luma for a luma position equal to a (correct) normalized luminance position (i.e. the non-reduced luma position which one would find on the vertical axis of achromatic greys as illustrated with FIG. 2B), divided by an output luma for the chromaticity-dependent luma of the pixel of the high dynamic range image. And now the high dynamic range video decoding circuit comprises a similar color lookup table determination circuit (303) with uses these G_PQ values to determine the color LUT CL(Y_PQ) to be loaded in the pixel color processor pipeline of the decoder, i.e. in LUT 102, but now all determined at the decoder side. There can still be detailed embodiments which rather than determine and load a color LUT, change a color LUT as communicated, where they balance the behavior (in circuit 303 or an equivalent separate circuit) of the original saturation processing LUT, and the needed correction according to the present invention, but those are details. E.g. the two LUTs can be interpolated, and the weight factor can be depending on a measure of severity of the artefact (e.g. how much darker an average pixel is compared to its surrounding, or a measure based on accumulating edge strengths or texture measures etc.), and then e.g. for a larger error, circuit 303 may dictate that the LUT as determined according to the present approach gets e.g. 80% weight i.e. the other LUT can be shown on top of the graph of FIG. 6, but can pull towards it only with a strength of 20%, etc. As is quite typical for technology, the solution is not 100% perfect then, but the problem is clearly mitigated.

What is new in this decoder is that the decoder in principle doesn't have the luminance L (which is usually readily available at the encoding side), but only Y_PQ.

There can be several manners in which one can determine L, which is performed by luminance calculator 701, but the simplest one is just do the matrixing from YCbCr to non-linear R'G'B'_PQ, then linearize via EOTF PQ, and then calculate the luminance via weighing of the R, G, and B component as explained with Eq. 1. Note that luminance calculator 701 typically calculates a luminance-luma, which goes into circuit 302 in the second of its calculations going through the entire luma mapping chain, as explained with FIG. 5.

Note that the decoder may also comprise a metadata checker, configured to check an indicator in metadata which indicates whether the encoder has already applied the necessary correction in the color lookup table it communicates. Normally the decoder will then not apply any correction to said lookup table, although some embodiments might still do their own calculations to verify and/or fine-tune the received color lookup table. It can also be that another mechanism for agreement between creation/coding side and consumption side is employed, e.g. a prefixed situation for a certain HDR video supply path, or something configured via a software update or user control, etc.

Figure 8:
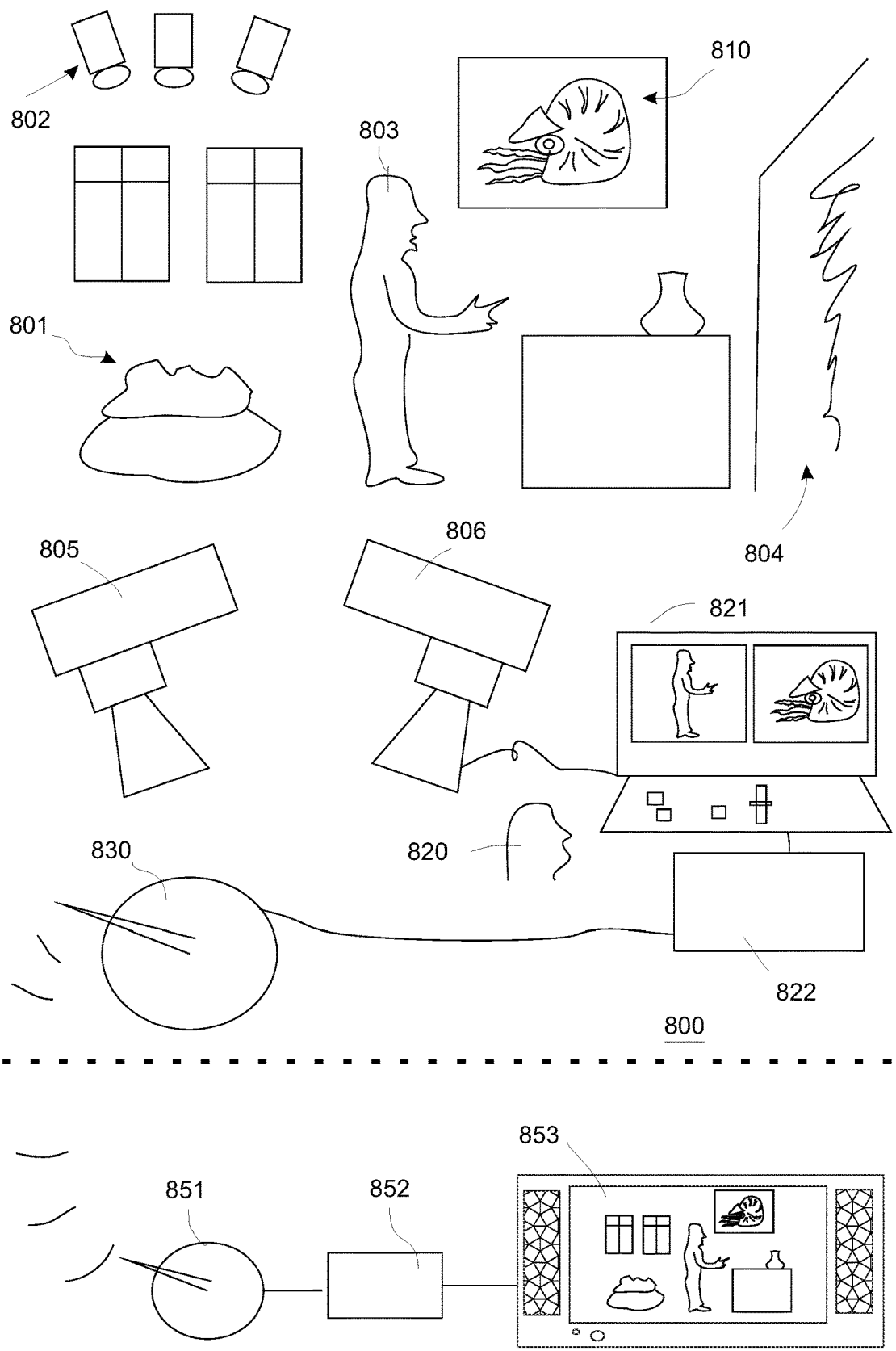
FIG. 8 shows the apparatuses in a typical deployment of the present technology, namely in a real time television broadcasting and reception (the same principles can also be used in other video communication technologies, e.g. non realtime digital movie production and grading, and later communication to cinemas, etc.).

FIG. 8 shows a typical (non limitative) example of a video communication ecosystem. On the video creation side we see a life broadcasting studio, in which a presenter 803 is e.g. presenting a science show. He can walk through various parts of the studio, which can be quite creatively (liberally) lit. E.g., there may be a bright region 801 of a presentation area, which is lit by many studio lights 802. There can also be darker areas 804. The video images are captured by one or typically more cameras (805, 806). Ideally those are of the same type, and color-coordinated, but e.g. one of the cameras may be a drone, etc. There is a final responsible person 820, who decides on the final production, and in particular its colorimetry (the skilled person knows that depending on the kind of production, several systems and even persons may be involved, but we will call for this elucidation this person 820 the color grader). He may have means like a panel for switching, directing, coloring, etc. He can watch one or more of the life productions on HDR reference monitors, and/or SDR monitors, etc. E.g., this show can also include for the teaching a secondary video 810, say of an underwater scene. This may e.g. be an SDR video or HDR video of different luminance dynamic range characteristics than the life camera feed(s). Looking at highest level of discussion, there can be two situations: the secondary video 810 may be actually shown with a particular light level, let's assume quite bright, or, it may be a green screen and the video only exists in the production booth of the final responsible person 820.

What is interesting for the present discussion, is that in the production booth the luma mapping can be determined. E.g., one may optimize before the life action starts, a mapping function which works, after setting the HDR cameras to a good iris level, well or reasonably well for all illumination areas. But one can also determine a couple of functions for the various regions, e.g. a camera zoom in on the dark region, and switch functions when calculating the final HDR image output in a video encoder 822, or use these functions for a per image automaton-optimized version of the function, with or without manual intervention, etc. Finally, in this example we have a satellite link via satellite dish 830 to consumers or professional intermediate stations, but the coded HDR video can also be output over the internet as video communication technology, etc. At the receiving side we typically have a home of a consumer, e.g. his living room 850. We elucidated this consumer getting the broadcasted HDR video via his local satellite dish 851, and a satellite tv settopbox 852, and the image are finally viewer on a HDR television 853, or other display. The HDR video decoder may be comprised in the settopbox or display. There may be a further image luminances optimization of the HDR image as received, with its coded peak brightness PB_C, to the maximum luminance PB_D of the consumer's television. This may happen in the settopbox, with an optimized image going over e.g. a HDMI cable or wireless video link or the like to the TV, or the settopbox may simply be a data passer and the television may comprise any decoder embodiment as described above.

The technical components providing any entirety or part of the innovation taught here above may (entirely or in part) be realized in practice as hardware (e.g. parts of an application specific IC) or as software running on a special digital signal processor, or a generic processor, FPGA, etc. Any processor, part of a processor, or complex of connected processors may have internal or external data busses, on-board or of-board memory such as cache, RAM, ROM, etc. The apparatuses in which the processor is comprised may have special protocols for special connections to hardware, such as image communication cable protocols like e.g. HDMI for connecting to a display etc., or internal connections for connecting to a display panel in case the apparatus is a display. Circuits may be configured by dynamic instructions prior to them performing their technical actions. Any element or apparatus may form part of a larger technical system, such as a video creation system at any content creation or distribution site, etc.

The skilled person should understand which technical components are available or usable for communicating (or storing) images, whether that is to another part of the world, or between two adjacent apparatuses, like e.g. HDR-suitable video cables, etc. The skilled person will understand under which situations one may use which form of video or image compression. The skilled person can understand that signals can be mixed, and that it is not absolutely necessary but can be advantageous to first mix before applying some calculations on the images, like e.g. the determination of an optimal S-curve, although this determination may, even when applied on a premixed image, still weigh various image aspects of e.g. the camera feed images and the secondary image in various particular manners. The skilled person understands that various realizations could work in parallel, e.g. by using several video encoders to output several HDR videos or video streams.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of technical elements allowing the realization of a particular objective, and can hence e.g. be (a small circuit part of) an IC, or a dedicated appliance (such as an appliance with a display), or part of a networked system, etc. "Arrangement" or "system" is also intended to be used in the broadest sense, so it may comprise inter alia a single apparatus, a part of an apparatus, a collection of (parts of) cooperating apparatuses, etc.

Some of the steps required for the operation of the method may be already present in the functionality of a processor instead of described in a computer program. Similarly some aspects with which the present innovation cooperates may be present in well-known technical circuits or elements, or separate apparatuses, e.g. the functioning of a display panel which will when driven by some color coding digital values show the corresponding displayed colors on the front of the screen, and such existing details will not be exhaustively debated, to make the teachings clearer by focusing on what exactly is contributed to the technical field.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the examples or claims, other combinations of the elements are possible. Any combination of elements can be realized in a single dedicated element. The skilled reader can understand that some processing orders can be swapped.

Any reference sign between parentheses in a claim is not intended for limiting the claim. The word "comprising" does not exclude the presence of elements or aspects not listed in a claim. The word "a" or "an" preceding an element does not exclude the presence of a plurality of such elements.

The invention claimed is:

1. A high dynamic range video encoding circuit comprising:
    a data formatter circuit,
    wherein the data formatter circuit is arranged to output a high dynamic range image and metadata to a video communication medium,
    wherein the high dynamic range image comprises first pixels,
    wherein the high dynamic range image encodes first luminances of the first pixels,
    wherein the first luminances have values which are less than or equal to a first maximum luminance,
    wherein each of the first luminances are encoded as first lumas,
    wherein each of the first pixels comprise two first chrominances,
    wherein the data formatter circuit encodes second pixels of a second image,
    wherein the second image encodes second luminances of the second pixels,
    wherein the second pixels correspond to the first pixels,
    wherein the second luminances have values which are less than or equal to a second maximum pixel luminance,
    wherein of the second luminances are encoded as second lumas,
    wherein the second maximum pixel luminance is lower than the first maximum pixel luminance,
    wherein the second luminances are encoded by a function,
    wherein the function defines the second lumas,
    wherein the second lumas are outputs of the function in response to first lumas of spatially collocated first pixels,
    wherein second chrominances of second pixels are based on chrominances of collocated first pixels and multiplier constants,
    wherein the multiplier constants are obtained from a color lookup table,
    wherein the color lookup table has a set of input indexes,
    wherein the set of input indexes span all possible values of the first pixel lumas,
    wherein the color lookup table defines a multiplier constant for each index,
    a gain determination circuit,
    wherein the gain determination circuit receives first pixels,
    wherein the gain determination circuit determines a luma gain value for each subset pixel in a portion of the first pixels,
    wherein the luma gain value is a ratio of a numerator divided by a denominator,
    wherein the numerator is obtained by applying the function to a normalized version of the luminance of one of the subset pixels,
    wherein the normalized version of the luminance of each of the subset pixels is obtained by dividing the luminance of each of the subset pixels by the first maximum luminance,
    wherein the denominator is obtained by applying the function to a normalized luma of one of the subset pixels,
    wherein the normalized luma is obtained by dividing the luma of each of the subset pixels by a maximum luma code; and
    a color lookup table determination circuit, wherein the color lookup table determination circuit is arranged to determine the color lookup table based on the luma gain values for at least a portion of lumas of subset pixels, wherein a portion of the multiplier constants for indices of the color lookup table correlate with the values of the luma gain values for the portion of lumas of subset pixels, wherein the data formatter circuit is arranged to output the color lookup table in the metadata.

2. The high dynamic range video encoding circuit as claimed in claim 1, wherein the color lookup table determination circuit is arranged to determine the values of the color lookup table based on a best fit function, wherein the best fit function summarizes a scatter plot of values of the luma gain value versus corresponding values of the normalized luma of each of the subset of pixels.

3. A high dynamic range video decoding circuit comprising:

a luma mapping circuit, wherein the luma mapping circuit is arranged to map a high dynamic range image to a second image, wherein the high dynamic range image comprises first pixels, wherein each of the first pixels comprise a first luma and two first chrominances, wherein the first luma codes a corresponding first luminance, wherein the high dynamic range image has a first maximum pixel luminance, wherein the second image comprises second pixels, wherein the pixels comprise a second luma and two second chrominances, wherein the second luma codes a corresponding second luminance, wherein the second image has a second maximum pixel luminance, wherein the second maximum pixel luminance is lower than the first maximum pixel luminance, wherein the mapping is from the first lumas to the second lumas;

a color mapping circuit, wherein the color mapping circuit comprises a color lookup table, wherein the color lookup table has a set of input indexes, wherein the set of input indexes span all possible values of the first pixel lumas, wherein the color lookup table is arranged to output a multiplier constant for each index of the set of input indices, a multiplier circuit, wherein the multiplier circuit is arranged to multiply the first chrominances by the multiplier constant so as to obtain the second chrominances, a gain determination circuit, wherein the gain determination circuit receives first pixels, wherein the gain determination circuit determines a luma gain value for each subset pixel in a portion of the first pixels, wherein the luma gain value is a ratio of a numerator divided by a denominator, wherein the numerator is obtained by applying the function to a normalized version of the luminance of one of the subset pixels, wherein the normalized version of the luminance of each of the subset pixels is obtained by dividing the luminance of each of the subset pixels by the first maximum luminance, wherein the denominator is obtained by applying the function to a normalized luma of one of the subset pixels, wherein the normalized luma is obtained by dividing the luma of each of the subset pixels by a maximum luma code;

a color lookup table determination circuit, wherein the color lookup table determination circuit is arranged to determine the color lookup table based on the luma gain values for at least a portion of lumas of subset pixels, wherein a portion of the multiplier constants for indices of the color lookup table correlate with the values of the luma gain values for the portion of lumas of subset pixels.

4. A method of encoding a high dynamic range video comprising:

outputting the high dynamic range image and a metadata to a video communication medium, wherein the high dynamic range image comprises first pixels, wherein the high dynamic range image encodes first luminances of the first pixels, wherein the first pixel luminances have values which are less than or equal to a first maximum luminance, wherein the first luminances are encoded as corresponding first pixel lumas, wherein each of the first pixels comprise two first chrominances, encoding a second image, wherein the second image corresponds to the high dynamic range image, wherein the second image comprises second pixels, wherein the second image encodes second luminances of the second pixels, wherein the second pixel luminances have values which are less than or equal to a second maximum luminance, wherein the second luminances are encoded as corresponding second pixel lumas, wherein the second maximum pixel luminance is lower than the first maximum pixel luminance, wherein the second luminances are encoded by a function, wherein the function defines pixel lumas of the second lumas, wherein the second lumas are outputs of the function in response to the first lumas of spatially collocated first pixels, wherein each of the second pixels comprise two second chrominances, wherein second chrominances of second pixels are based on chrominances of collocated first pixels and multiplier constants, wherein the multiplier constants are obtained from a color lookup table, wherein the color lookup table has a set of input indexes, wherein the set of input indexes span all possible values of the first pixel lumas, wherein the color lookup table defines a multiplier constant for each index,
wherein each of the two second chrominances is obtained by multiplying a corresponding one of the two first chrominances by a multiplier constant;
determining a luma gain value for each subset pixel in a portion of the first pixels,
wherein the luma gain value is a ratio of a numerator divided by a denominator,
wherein the numerator is obtained by applying the function to a normalized version of the luminance of one of the subset pixels,
wherein the normalized version of the luminance of each of the subset pixels is obtained by dividing the luminance of each of the subset pixels by the first maximum luminance,
wherein the denominator is obtained by applying the function to a normalized luma of one of the subset pixels,
wherein the normalized luma is obtained by dividing the luma of each of the subset pixels by a maximum luma code; and
determining a color lookup table,
wherein the color lookup table is determined based on the luma gain value for at least a portion of lumas of subset pixels,
wherein a portion of the multiplier constants for indices of the color lookup table correlates with the values of the luma gain values for the portion of lumas of subset pixels,
outputting the color lookup table in the metadata.

5. A method of high dynamic range video decoding comprising:
color mapping a high dynamic range image to a second image,
wherein the high dynamic range image comprises first pixels,
wherein each of the first pixels comprise a first luma and two first chrominances,
wherein the first luma codes a corresponding first luminance,
wherein the high dynamic range image has a first maximum pixel luminance,
wherein the second image comprises second pixels,
wherein the pixels comprise a second luma and two second chrominances,
wherein the second luma codes a corresponding second luminance,
wherein the second image has a second maximum pixel luminance,
wherein the second maximum pixel luminance is lower than the first maximum pixel luminance,
wherein the mapping is from the first lumas to the second lumas,
wherein the mapping comprises:
applying a function so as to define the second lumas of the second pixels;
color mapping the first chrominances to second chrominances using a color lookup table,
wherein the lookup table is arranged to output multiplier constants,
wherein the color lookup table has a set of input indexes,
wherein the set of input indexes span all possible values of the first pixel lumas,
wherein the color lookup table defines a multiplier constant for each index;
multiplying the first chrominances by the multiplier constant so as to obtain the second chrominances;
determining for each subset pixel in a portion of the first pixels a luma gain value,
wherein the luma gain value is a ratio of a numerator divided by a denominator,
wherein the numerator is obtained by applying the function to a normalized version of the luminance of one of the subset pixels,
wherein the normalized version of the luminance of each of the subset pixels is obtained by dividing the luminance of each of the subset pixels by the first maximum luminance,
wherein the denominator is obtained by applying the function to a normalized luma of one of the subset pixels,
wherein the normalized luma is obtained by dividing the luma of each of the subset pixels by a maximum luma code;
determining the color lookup table,
wherein the color lookup table is based on the luma gain values for at least a portion of lumas of subset pixels,
wherein a portion of the multiplier constants for indices of the color lookup table correlates with the values of the luma gain values for the portion of lumas of subset pixels.

6. A computer program stored on a non-transitory medium, wherein the computer program when executed on a processor performs a method of encoding a high dynamic range video, the method comprising:
outputting the high dynamic range image and a metadata to a video communication medium,
wherein the high dynamic range image comprises first pixels,
wherein the high dynamic range image encodes first luminances of the first pixels,
wherein the first pixel luminances have values which are less than or equal to a first maximum luminance,
wherein the first luminances are encoded as corresponding first pixel lumas,
wherein each of the first pixels comprise two first chrominances,
encoding a second image,
wherein the second image corresponds to the high dynamic range image,
wherein the second image comprises second pixels,
wherein the second image encodes second luminances of the second pixels,
wherein the second pixel luminances have values which are less than or equal to a second maximum luminance,
wherein the second luminances are encoded as corresponding second pixel lumas,
wherein the second maximum pixel luminance is lower than the first maximum pixel luminance,
wherein the second luminances are encoded by a function,
wherein the function defines pixel lumas of the second lumas,
wherein the second lumas are outputs of the function in response to the first lumas of spatially collocated first pixels,
wherein each of the second pixels comprise two second chrominances, wherein second chrominances of second pixels are based on chrominances of collocated first pixels and multiplier constants, wherein the multiplier constants are obtained from a color lookup table, wherein the color lookup table has a set of input indexes, wherein the set of input indexes span all possible values of the first pixel lumas, wherein the color lookup table defines a multiplier constant for each index, wherein each of the two second chrominances is obtained by multiplying a corresponding one of the two first chrominances by a multiplier constant;

determining a luma gain value for each subset pixel in a portion of the first pixels, wherein the luma gain value is a ratio of a numerator divided by a denominator, wherein the numerator is obtained by applying the function to a normalized version of the luminance of one of the subset pixels, wherein the normalized version of the luminance of each of the subset pixels is obtained by dividing the luminance of each of the subset pixels by the first maximum luminance, wherein the denominator is obtained by applying the function to a normalized luma of one of the subset pixels, wherein the normalized luma is obtained by dividing the luma of each of the subset pixels by a maximum luma code; and determining a color lookup table, wherein the color lookup table is determined based on the luma gain value for at least a portion of lumas of subset pixels, wherein a portion of the multiplier constants for indices of the color lookup table correlates with the values of the luma gain values for the portion of lumas of subset pixels, outputting the color lookup table in the metadata.

7. A computer program stored on a non-transitory medium, wherein the computer program when executed on a processor performs a method of high dynamic range video decoding, the method comprising:

color mapping a high dynamic range image to a second image, wherein the high dynamic range image comprises first pixels, wherein each of the first pixels comprise a first luma and two first chrominances, wherein the first luma codes a corresponding first luminance, wherein the high dynamic range image has a first maximum pixel luminance, wherein the second image comprises second pixels, wherein the pixels comprise a second luma and two second chrominances, wherein the second luma codes a corresponding second luminance, wherein the second image has a second maximum pixel luminance, wherein the second maximum pixel luminance is lower than the first maximum pixel luminance, wherein the mapping is from the first lumas to the second lumas, wherein the mapping comprises:

applying a function so as to define the second lumas of the second pixels;

color mapping the first chrominances to second chrominances using a color lookup table, wherein the lookup table is arranged to output multiplier constants, wherein the color lookup table has a set of input indexes, wherein the set of input indexes span all possible values of the first pixel lumas, wherein the color lookup table defines a multiplier constant for each index;

multiplying the first chrominances by the multiplier constant so as to obtain the second chrominances;

determining for each subset pixel in a portion of the first pixels a luma gain value, wherein the luma gain value is a ratio of a numerator divided by a denominator, wherein the numerator is obtained by applying the function to a normalized version of the luminance of one of the subset pixels, wherein the normalized version of the luminance of each of the subset pixels is obtained by dividing the luminance of each of the subset pixels by the first maximum luminance, wherein the denominator is obtained by applying the function to a normalized luma of one of the subset pixels, wherein the normalized luma is obtained by dividing the luma of each of the subset pixels by a maximum luma code;

determining the color lookup table, wherein the color lookup table is based on the luma gain values for at least a portion of lumas of subset pixels, wherein a portion of the multiplier constants for indices of the color lookup table correlates with the values of the luma gain values for the portion of lumas of subset pixels.

* * * * *